(12) United States Patent
Lee et al.

(10) Patent No.: US 12,443,227 B2
(45) Date of Patent: Oct. 14, 2025

(54) WEARABLE ELECTRONIC DEVICE

(71) Applicant: SAMSUNG ELECTRONICS CO., LTD., Suwon-si (KR)

(72) Inventors: Jooho Lee, Suwon-si (KR); Jaeyong Sim, Suwon-si (KR); Yongjun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/954,022

(22) Filed: Nov. 20, 2024

(65) Prior Publication Data
US 2025/0076925 A1 Mar. 6, 2025

Related U.S. Application Data

(63) Continuation of application No. PCT/KR2023/006698, filed on May 17, 2023.

(30) Foreign Application Priority Data

Jun. 7, 2022 (KR) .................. 10-2022-0069100
Jul. 1, 2022 (KR) .................. 10-2022-0081067

(51) Int. Cl.
*G06F 1/16* (2006.01)
*H05K 1/02* (2006.01)
*H05K 1/14* (2006.01)

(52) U.S. Cl.
CPC ............ *G06F 1/163* (2013.01); *G06F 1/1637* (2013.01); *H05K 1/0256* (2013.01); *H05K 1/144* (2013.01); *G06F 1/1694* (2013.01)

(58) Field of Classification Search
CPC ...... G06F 1/163; G06F 1/1637; G06F 1/1694; G06F 1/16; H05K 1/0256; H05K 1/144;
(Continued)

(56) References Cited

U.S. PATENT DOCUMENTS 5,644,474 A 7/1997 Jang
8,270,914 B2 9/2012 Pascolini et al.
(Continued)

FOREIGN PATENT DOCUMENTS

KR 96-35520 U 11/1996
KR 10-2009-0033157 A 4/2009
(Continued)

OTHER PUBLICATIONS

International Search Report dated Sep. 12, 2023, issued by the International Searching Authority in International Application No. PCT/KR2023/006698.

*Primary Examiner* — Matthew A Eason
*Assistant Examiner* — Chayce R Bibbee
(74) *Attorney, Agent, or Firm* — Sughrue Mion, PLLC

(57) ABSTRACT

An electronic device includes: a frame including a side wall and at least partially forming an antenna; a bracket provided within the frame; a first printed circuit board provided on the bracket and including at least one grounding portion; a second printed circuit board provided within the frame; and a screw, where the second printed circuit board includes: a first portion coupled to the first printed circuit board; an extension portion extending from the first portion between the side wall of the frame and the bracket; a second portion extending from the extension portion between the first printed circuit board and the bracket; and a conductive trace extending from the first portion to the second portion through the extension portion, and where the conductive trace is electrically connected to the at least one grounding portion of the first printed circuit board in the second portion.

20 Claims, 16 Drawing Sheets

(58) Field of Classification Search
CPC ...... H05K 1/0215; G04G 17/04; G04G 17/06;
G04G 21/02; G04G 21/04; G04G 99/00;
H01Q 1/27
See application file for complete search history.

(56) References Cited

U.S. PATENT DOCUMENTS

| | | | |
|---|---|---|---|
| 10,020,572 | B2 | 7/2018 | Kim et al. |
| 10,141,626 | B2 | 11/2018 | Tan et al. |
| 10,542,632 | B2 | 1/2020 | Kim et al. |
| 10,620,669 | B2 | 4/2020 | Kim et al. |
| 11,245,207 | B2 | 2/2022 | Park et al. |
| 11,949,153 | B2 | 4/2024 | Kim et al. |
| 2011/0136447 | A1 | 6/2011 | Pascolini et al. |
| 2013/0009828 | A1 | 1/2013 | Pascolini et al. |
| 2016/0028148 | A1 | 1/2016 | Tan et al. |
| 2017/0045916 | A1 | 2/2017 | Kim et al. |
| 2017/0048991 | A1* | 2/2017 | Kim .................. H01Q 1/48 |
| 2017/0290184 | A1 | 10/2017 | Kim et al. |
| 2020/0266562 | A1 | 8/2020 | Park et al. |
| 2022/0151070 | A1 | 5/2022 | Lee et al. |

FOREIGN PATENT DOCUMENTS

| | | | |
|---|---|---|---|
| KR | 20-2016-0000374 | U | 2/2016 |
| KR | 10-2017-0020138 | A | 2/2017 |
| KR | 10-2017-0020139 | A | 2/2017 |
| KR | 10-2020-0101018 | A | 8/2020 |
| KR | 10-2021-0014606 | A | 2/2021 |
| KR | 10-2021-0015460 | A | 2/2021 |
| KR | 10-2022-0059268 | A | 5/2022 |
| KR | 10-2023-0001477 | A | 1/2023 |

* cited by examiner

WEARABLE ELECTRONIC DEVICE

CROSS-REFERENCE TO RELATED APPLICATION(S)

This application is a continuation of International Application No. PCT/KR2023/006698, filed on May 17, 2023, in the Korean Intellectual Property Receiving Office, which is based on and claims priority to Korean Patent Applications No. 10-2022-0069100, filed on Jun. 7, 2022 and No. 10-2022-0081067, filed on Jul. 1, 2022, in the Korean Intellectual Property Office, the disclosures of which are incorporated by reference herein in their entireties.

BACKGROUND ART

1. Field

Embodiments disclosed herein relate to a wearable electronic device.

2. Description of Related Art

Electronic devices may include an antenna for transmitting and receiving wireless signals. The antenna may include at least a portion of a housing as an antenna element. For example, the antenna of the electronic device may use a metal part forming at least a portion of the housing as a radiating element of the antenna.

Meanwhile, the electronic device may include a plurality of electronic components, such as a key button switch, an acoustic sensor, and a biometric sensor, which are at least partially exposed through the housing, to implement various functions. The electronic device may include a connecting member (e.g., a flexible printed circuit board) disposed adjacent to the housing to operatively connect the plurality of electronic components.

The performance of an antenna including at least a portion of a housing may be degraded by a plurality of electronic components adjacent to the housing and a flexible printed circuit board operatively connecting the components. For example, noise generated from the plurality of electronic components may affect the radiation performance of the antenna. For another example, at least a portion of the flexible printed circuit board on which electronic components are disposed may act as an element of the antenna, thereby introducing unwanted parasitic components. Antenna signals may be induced into the adjacent housing, which may degrade the radiation performance of the antenna.

In order to improve the performance degradation, a matching element or a method using ground switching may be applied.

SUMMARY

According to one embodiment of the present disclosure, a printed circuit board connecting a plurality of components capable of reducing or preventing degradation of antenna performance and a wearable electronic device including the same may be provided.

Additional aspects will be set forth in part in the description which follows and, in part, will be apparent from the description, or may be learned by practice of the presented embodiments.

According to an aspect of the disclosure, an electronic device may include: a frame including a side wall and at least partially forming an antenna; a bracket provided within the frame; a first printed circuit board provided on the bracket and including at least one grounding portion; a second printed circuit board provided within the frame; and a screw, where the second printed circuit board includes: a first portion coupled to the first printed circuit board; an extension portion extending from the first portion between the side wall of the frame and the bracket; a second portion extending from the extension portion between the first printed circuit board and the bracket; and a conductive trace extending from the first portion to the second portion through the extension portion, where the conductive trace is electrically connected to the at least one grounding portion of the first printed circuit board in the second portion, and where the screw passes through the first printed circuit board and the second portion of the second printed circuit board and is fastened to the bracket.

The first printed circuit board may include a first surface, and a second surface opposite to the first surface and facing the bracket, where the first printed circuit board includes a first conductive region provided on the second surface, where the second portion of the second printed circuit board includes a second conductive region facing the first conductive region, and where the conductive trace is electrically connected to the at least one grounding portion through the first conductive region and the second conductive region that are in contact.

The first conductive region may extend from the at least one grounding portion, where the conductive trace extends from the second conductive region.

The second portion of the second printed circuit board may include a hole through which the screw passes, where the second conductive region surrounds the hole.

The first printed circuit board may include a hole through which the screw passes, where the first conductive region surrounds the hole.

The first printed circuit board may include a third conductive region provided on the first surface and in contact with the screw.

The second conductive region of the second printed circuit board may be electrically isolated from the screw.

The extension portion may include a first end, a second end, and a portion between the first end and the second end, where the first portion extends from the first end, and where the second portion extends from the portion between the first end and the second end.

The electronic device may further include a first button, and a second button at least partially exposed through the side wall, where, with respect to a direction perpendicular to the side wall, the first button at least partially overlaps the first end of the extension portion, and the second button at least partially overlaps the second end of the extension portion.

The may further include: a first component provided at the first end of the extension portion and operatively connected to the first button; and a second component provided at the second end of the extension portion and operatively connected to the second button.

The electronic device may further include an acoustic sensor provided in the portion between the first end and the second end of the extension portion.

The electronic device may further include a display at least partially accommodated in the frame, where the bracket is between the display and the first printed circuit board.

The first printed circuit board may include a receptacle, where the first portion of the second printed circuit board includes a plug coupled to the receptacle.

The first conductive region and the second conductive region may be in surface-to-surface contact.

According to an aspect of the disclosure, a wearable electronic device may include: a frame including a side wall and at least partially forming an antenna; a bracket provided within the frame; a first printed circuit board provided on the bracket; a second printed circuit board provided within the frame; and a screw, where the first printed circuit board includes at least one grounding portion, and a first conductive region electrically connected to the at least one grounding portion, where the second printed circuit board includes: a first portion coupled to the first printed circuit board; an extension portion extending from the first portion between the side wall of the frame and the bracket; a second portion extending from the extension portion between the first printed circuit board and the bracket to at least partially overlap the first conductive region; and a conductive trace extending from the first portion to the second portion through the extension portion, where the conductive trace is electrically connected to the at least one grounding portion through the first conductive region of the first printed circuit board in the second portion, and where the screw passes through the first printed circuit board and the second portion of the second printed circuit board and is fastened to the bracket.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
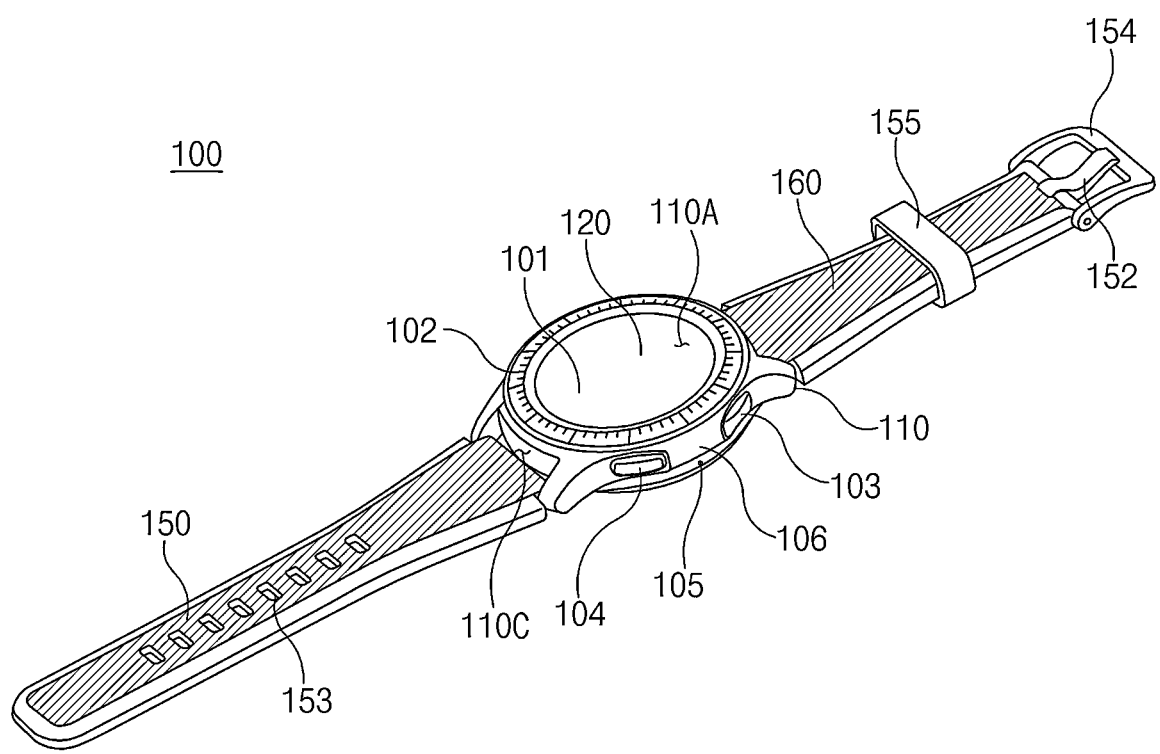
FIG. 1 is a perspective view of the front of a mobile electronic device according to an embodiment.

Hereinafter, various embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure. In the present disclosure, redundant descriptions of components having the same reference numerals may be omitted.

FIG. 1 is a perspective view of the front of a mobile electronic device according to one embodiment.

Figure 2:
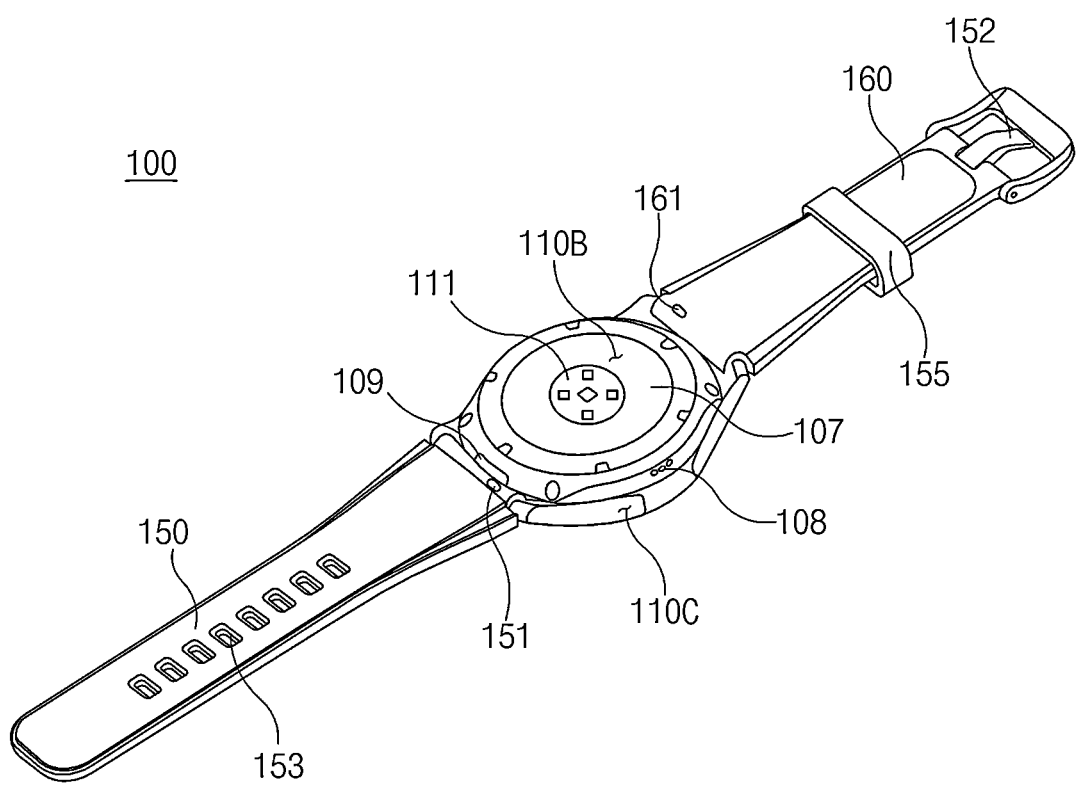
FIG. 2 is a perspective view of the back of the electronic device according to an embodiment.

FIG. 2 is a perspective view of the back of the electronic device according to one embodiment.

FIGS. 1 and 2, an electronic device 100 according to one embodiment may include a housing 110 including a first surface (or front surface) 110A, a second surface (or back surface) 110B, and a side surface 110C surrounding a space between the first surface 110A and the second surface 110B, and coupling members 150 and 160 connected to at least a portion of the housing 110 and configured to detachably couple the electronic device 100 to a body part (e.g., wrist or the like) of a user. In another embodiment, the housing may refer to a structure forming some of the first surface 110A, the second surface 110B, and the side surface 110C in FIG. 1. According to one embodiment, the first surface 110A may be formed by a front plate 101 (e.g., a glass plate or a polymer plate including various coating layers) that is at least partially substantially transparent. The second surface 110B may be formed by a back plate 107. The back plate 107 may include a substantially transparent region and/or substantially opaque region. The back plate 107 may be formed, for example, by coated or colored glass, ceramic, polymer, metal (e.g., aluminum, stainless steel (STS), or magnesium), or a combination of at least two of the materials. The side surface 110C may be coupled to the front plate 101 and the back plate 107, and may be formed by a frame 106 containing metal and/or polymer. The frame 106 may be referred to as a frame structure, a side bezel structure, or a side member. In some embodiments, the back plate 107 and the frame 106 may be integrally formed, and may include the same material (e.g., a metal material such as aluminum). The coupling members 150 and 160 may be formed of various materials and in various shapes. The coupling members 150 and 160 may be formed in an integrated type or so that a plurality of unit links are flowable with each other, by the woven fabric, leather, rubber, urethane, metal, ceramic, or a combination of at least two of the materials.

According to one embodiment, the electronic device 100 may include at least one of a display 120, audio modules 105 and 108, a sensor module 111, key input devices 102, 103, and 104, and connector holes 109. In some embodiments, the electronic device 100 may omit at least one of the components (e.g., the key input devices 102, 103 and 104, the connector hole 109, or the sensor module 111) or may additionally include other components.

The display 120 may be exposed through a significant portion of the front plate 101. For example, the display 120 may be visually seen through a transparent region of the front plate 101. The shape of the display 120 may be a shape corresponding to the shape of the front plate 101, and may have various shapes such as a circular shape, an oval shape, or a polygonal shape. The display 120 may be combined with or disposed to be adjacent to a touch sensing circuit, a pressure sensor capable of measuring the intensity (pressure) of the touch, and/or a fingerprint sensor.

The audio modules 105 and 108 may include a microphone hole 105 and a speaker hole 108. The microphone hole 105 may have a microphone for acquiring external sound disposed therein, and in some embodiments, a plurality of microphones may be disposed to detect the direction of sound. The speaker hole 108 may be used as an external speaker and a call receiver. In some embodiments, the speaker holes 107 and 114 and the microphone hole 105 may be implemented as one hole, or a speaker may be included without the speaker holes 107 and 114 (e.g., a piezo speaker).

The sensor module 111 may generate an electrical signal or data value corresponding to an internal operational state or an external environmental state of the electronic device 100. The sensor module 111 may include, for example, a biometric sensor module 111 (e.g., an HRM sensor) disposed on the second surface 110B of the housing 110. The electronic device 100 may further include a sensor module, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The key input device 102, 103, and 104 may be disposed on the first surface 110A of the housing 110, and may include a wheel key 102 rotatable in at least one direction, and/or side key buttons 102 and 103 disposed on the side surface 110C of the housing 110. The wheel key may have a shape corresponding to the shape of the front plate 101. In other embodiments, the electronic device 100 may not include some or all of the key input devices 102, 103, and 104 or may further include other key input devices. At least some of the key input devices 102, 103, and 104 may be implemented in other forms, such as soft keys, on the display 120.

The electronic device 100 may further include a connector hole. The connector hole may accommodate a connector (e.g., a USB connector) for transmitting and/or receiving electric power and/or data to and/or from an external electronic device, or accommodate a connector (e.g., an earphone connector) for transmitting and/or receiving audio signals to and/or from an external electronic device.

The coupling members 150 and 160 may be detachably coupled to at least a partial region of the housing 110 using locking members 151 and 161. The coupling members 150 and 160 may include one or more of a fixing member 152, a fixing member fastening hole 153, a band guide member 154, and a band fixing ring 155.

The fixing member 152 may be configured to fix the housing 110 and the coupling members 150 and 160 to a body part (e.g., a wrist or the like) of the user. The fixing member fastening hole 153 may fix the housing 110 and the coupling members 150 and 160 to the user's body part corresponding to the fixing member 152. The band guide member 154 may be configured to limit the range of movement of the fixing member 152 when the fixing member 152 is fastened to the fixing member fastening hole 153, thereby making it possible for the coupling members 150 and 160 to be closely coupled to the user's body part. The band fixing ring 155 may limit the range of movement of the coupling members 150 and 160 in a state in which the fixing member 152 and the fixing member fastening hole 153 are fastened. However, the configuration that enables the electronic device 100 to be worn on the user's body, such as the fixing member 152 of the coupling members 150 and 160 and the fixing member fastening hole 153, is not limited to the above-described example, and various mechanisms may be applied.

Figure 3:
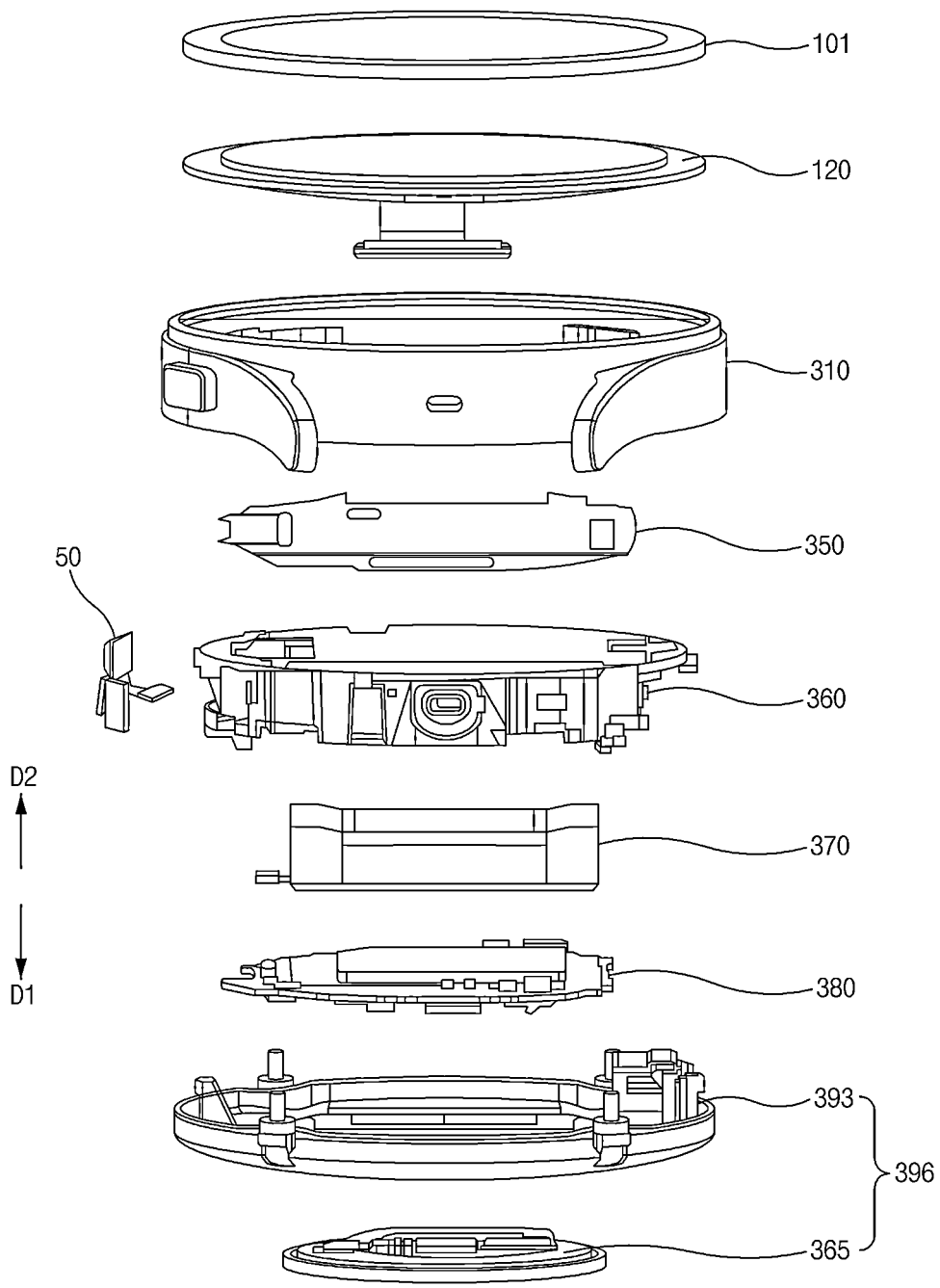
FIG. 3 is a developed perspective view of an electronic device according to an embodiment.

FIG. 3 is a developed perspective view of an electronic device according to one embodiment. Referring to FIG. 3, an electronic device 300 (e.g., the electronic device 100 in FIG. 1) may include a front plate 101, a display 120, a frame 310 (e.g., the frame 106 in FIG. 1), a first antenna 350, a bracket 360, a battery 370, a first printed circuit board 380, a second printed circuit board 50, and a back plate 396.

The front plate 101 may be disposed at an upper portion of the frame 310 (e.g., in a second direction D2). The back plate 396 (e.g., the back plate 107 in FIG. 1) may be disposed at a lower portion of the frame 310 (e.g., in a first direction D1). The back plate 396 may include a back case 393 and a back cover 365. The back cover 365 may be disposed on one surface of the back case 393 (e.g., a surface facing the first direction D1). The back case 393 may be coupled to the frame 310. The back cover 365 may be coupled to the back case 393. In another embodiment, the back case 393 and the back cover 365 may be integrally formed.

The frame 310 may surround a space between the front plate 101 and the back plate 396. For example, the frame 310 may include a portion (e.g., a side wall 415 in FIG. 4a) extending from the front plate 101 to the back plate 396 to surround the space.

The front plate 101 may be coupled to the upper portion of the frame 310 (e.g., in the second direction D2). The back plate 396 may be coupled to the lower portion of the frame 310 (e.g., in the first direction D1). Between the frame 310 and the back case 393, a sealing member (e.g., waterproof tape or waterproof adhesive tape) configured to block moisture and foreign substances from flowing into the interior of the electronic device 300 from the outside may be interposed. The front plate 101, the frame 310, and the back plate 396 coupled together may define an internal space of the electronic device 300. In the internal space, the display 120, the first antenna 350, the bracket 360, the battery 370, the first printed circuit board 380, and the second printed circuit board 50 may be disposed. At least a portion of the front plate 101, the frame 310, and the back plate 396 may be referred to as a housing of the electronic device 300 (e.g., the housing 110 in FIG. 1).

The display 120 may be disposed between the front plate 101 and the bracket 360. The display 120 may be at least partially accommodated within the frame 310. The display 120 may be attached to a back surface of the front plate 101 (e.g., a surface facing the first direction D1). For example, the display 120 may be attached to the front plate 101 by an optical adhesive member (e.g., an optically clear adhesive (OCA) or optically clear resin (OCR)).

The bracket 360 may be disposed inside the frame 310. The bracket 360 may be surrounded by the frame 310. The bracket 360 may be at least partially spaced apart from an inner surface of the frame 310. The second printed circuit board 50 may be disposed in a space defined by the spacing of the bracket 360 and the frame 310.

The display 120 and the first antenna 350 may be disposed on one surface (e.g., in the second direction D2) of the bracket 360, and the battery 370 and the first printed circuit board 380 may be disposed on the other surface (e.g., in the first direction D1). The bracket 360 may support the display 120, the first antenna 350, the battery 370, the first printed circuit board 380, and the second printed circuit board 50. The bracket 360 may be referred to as a supporting member.

The bracket 360 may be provided separately from the frame 310 and coupled to the frame 310, or may be formed integrally with the frame 310. The bracket 360 may be formed of, for example, a metallic material and/or a non-metallic (e.g., a polymer such as plastic) material.

The first printed circuit board 380 may be disposed between the bracket 360 and the back plate 396. On the first printed circuit board 380, a processor (e.g., a processor 1020 in FIG. 10), a memory (e.g., a memory 1030 in FIG. 10), and/or an interface (e.g., an interface 1077 in FIG. 10) may be installed. The processor may include, for example, one or more of a central processing unit, an application processor, a graphic processing unit (GPU), an application processor sensor processor, or a communication processor. The memory may include, for example, a volatile memory or a non-volatile memory. The interface may include, for example, a high definition multimedia interface (HDMI), a universal serial bus (USB) interface, a secure digital (SD) card interface, and/or an audio interface. The interface may include a connector (e.g., a connecting terminal 1078 in FIG. 10), such as a USB connector, an SD card/MMC connector, or an audio connector, for electrically or physically connecting the electronic device 300 to an external electronic device.

The battery 370 may be a device for supplying electric power to at least one of the components of the electronic device 300, and may include, for example, a secondary cell which is rechargeable. The battery 370 may be disposed between the bracket 360 and the first printed circuit board 380. The battery 370 may be at least partially disposed within an accommodating space (e.g., a recess) formed in one surface of the bracket 360 (e.g., a surface facing the first direction D1). The battery 370 may be attached to the bracket 360 through an adhesive member (e.g., adhesive or adhesive tape).

The first antenna 350 may be disposed between the display 120 and the bracket 360. The first antenna 350 may include, for example, a near field communication (NFC) antenna, a wireless charging antenna, and/or a magnetic secure transmission (MST) antenna. The first antenna 350 may, for example, perform short-range communication with an external device, wirelessly transmit and receive power required for charging, and transmit a short-range communication signal or a self-based signal including payment data.

Figure 4A:
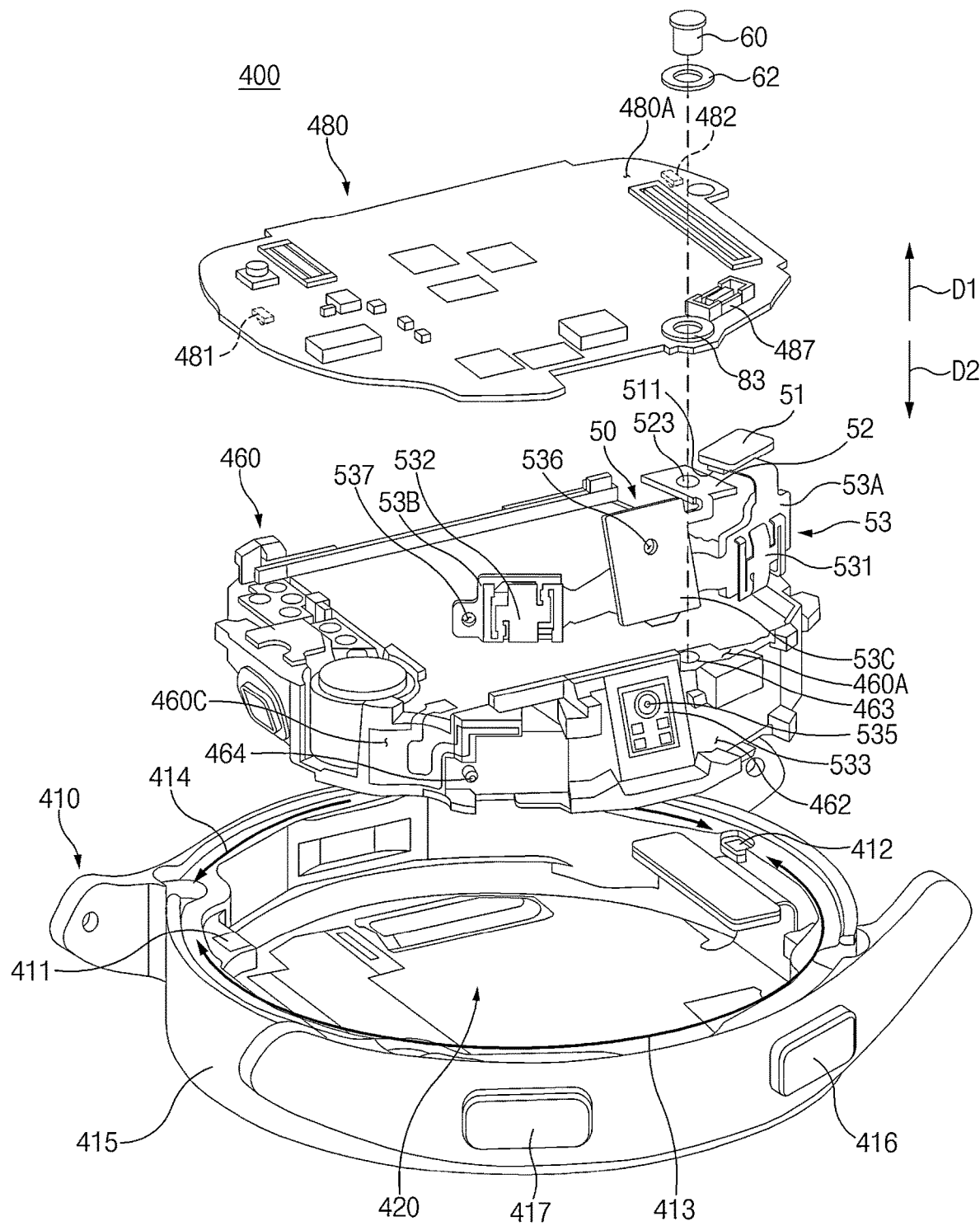
FIG. 4A is an exploded perspective view showing some components of an electronic device according to an embodiment.
Figure 4B:
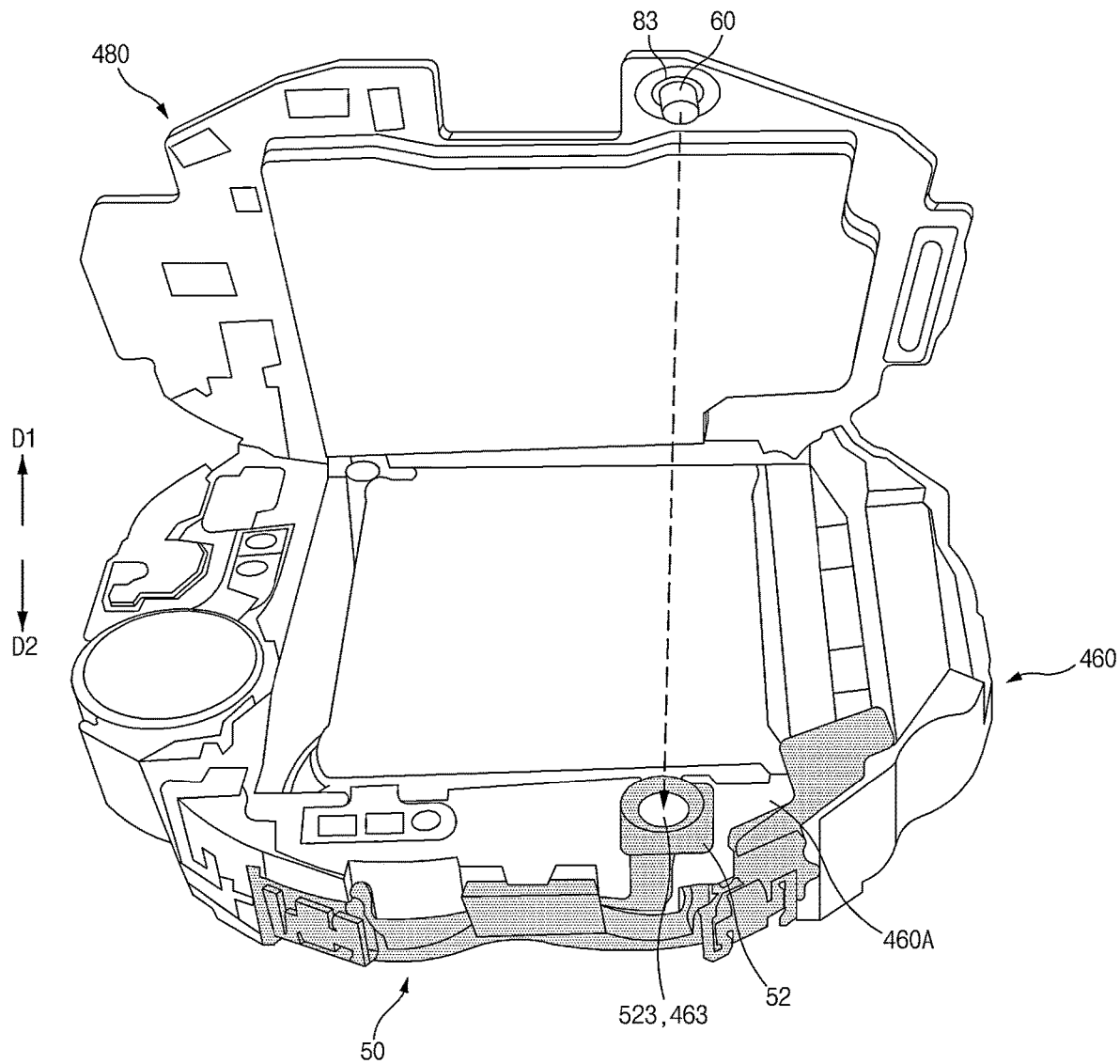
FIG. 4B is a perspective view showing some components of the electronic device according to an embodiment.
Figure 4C:
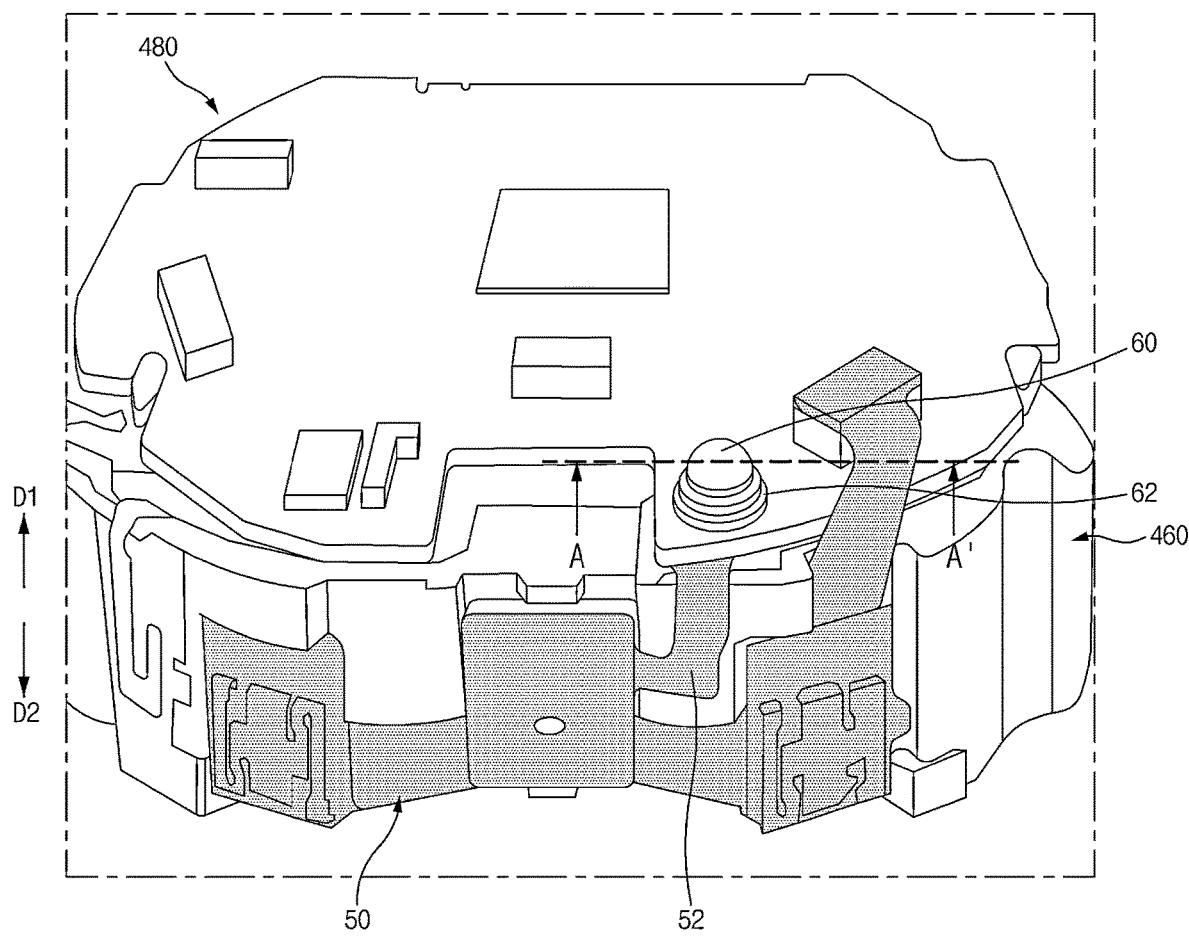
FIG. 4C is a perspective view showing some components of the electronic device according to an embodiment.
Figure 5:
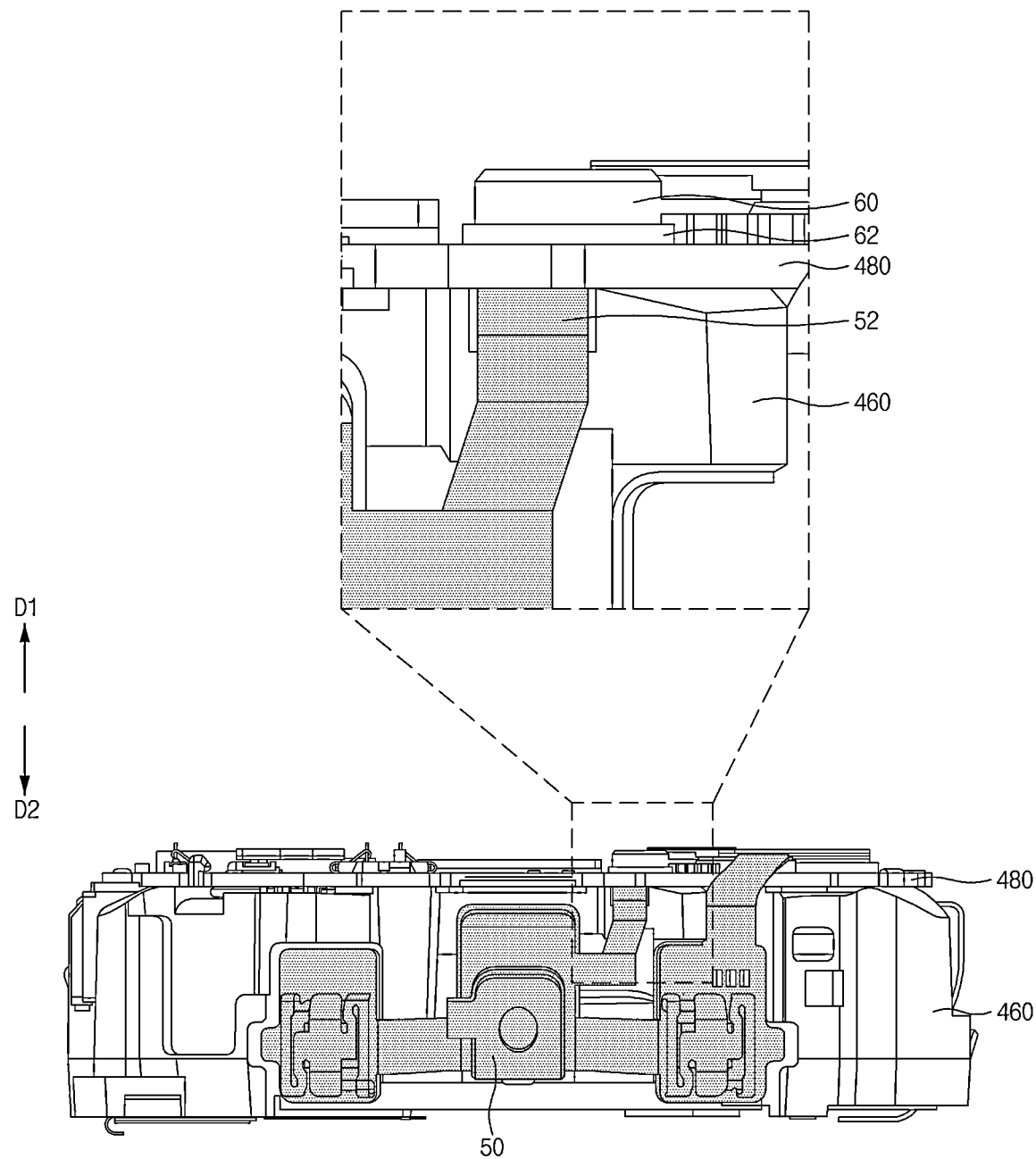
FIG. 5 is a view showing some components of the electronic device according to an embodiment.

FIG. 4a is an exploded perspective view showing some components of an electronic device according to one embodiment. FIG. 4b is a perspective view showing some components of the electronic device according to one embodiment. FIG. 4c is a perspective view showing some components of the electronic device according to one embodiment. FIG. 5 is a view showing some components of the electronic device according to one embodiment. FIG. 4b shows a state in which a first printed circuit board 480 is not coupled to a bracket 460, and FIG. 4c and FIG. 5 show a state in which the first printed circuit board 480 is coupled to the bracket 460.

Referring to FIG. 4a, an electronic device 400 (e.g., electronic device 300 in FIG. 3) according to one embodiment may include a first printed circuit board 480, a bracket 460, a frame 410, a screw 60, a washer 62, a second printed circuit board 50, a first button 416, a second button 417, and a display 420.

The first printed circuit board 480 (e.g., the first printed circuit board 380 in FIG. 3) may include a first surface 480A and a second surface 480B facing a direction opposite to the first surface 480A. For example, the first surface 480A of the first printed circuit board 480 may face a second direction D2, and the second surface 480B thereof may face a first direction D1 opposite to the second direction D2.

Figure 10:
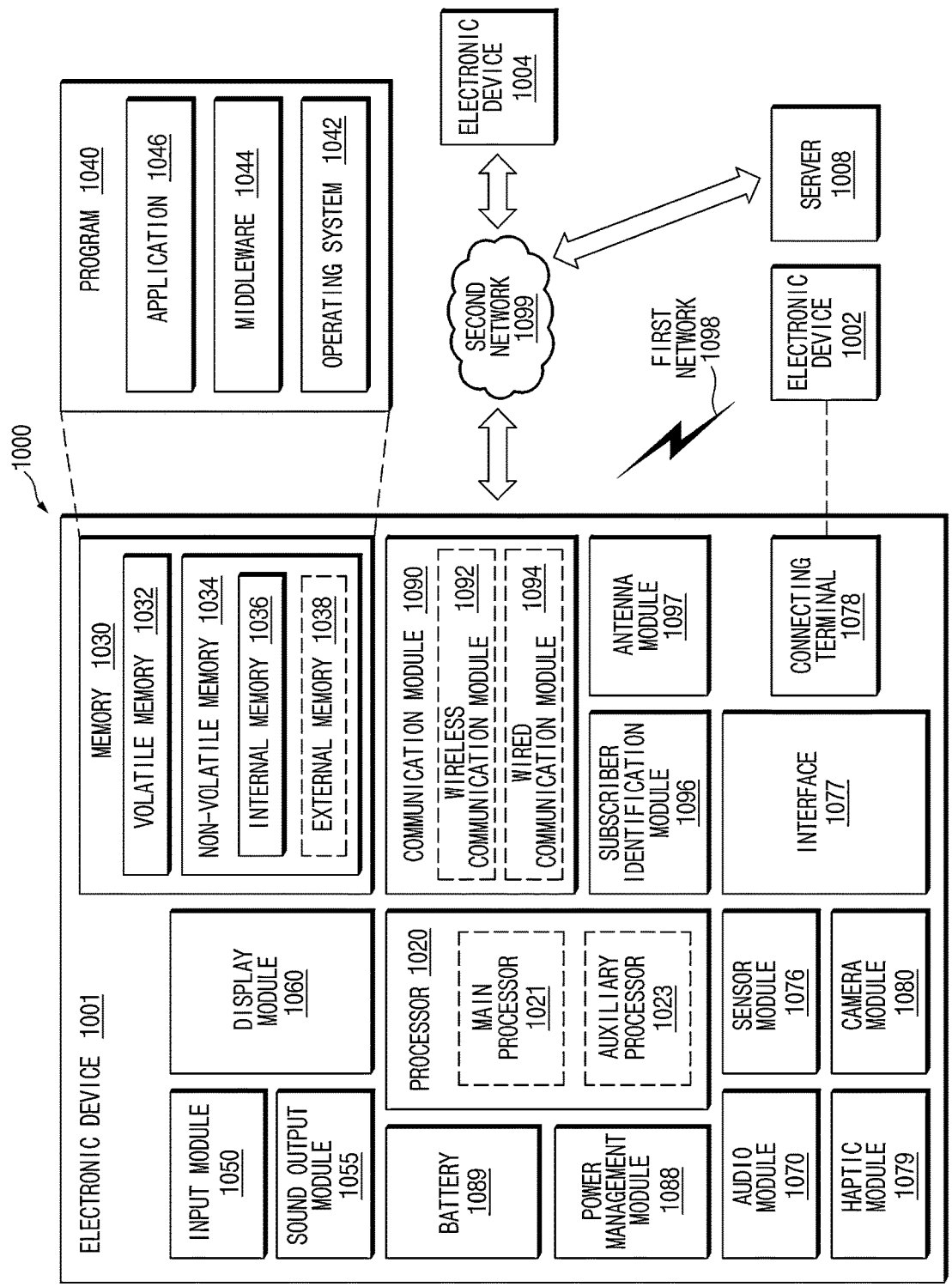
FIG. 10 is a block diagram of an electronic device in a network environment according to an embodiment.

On the first surface 480A and/or the second surface 480B of the first printed circuit board 480, various electronic components (e.g., a processor 1020 and a wireless communication module 1092 in FIG. 10) may be disposed. A protection member that protects electronic components disposed on the first printed circuit board 480 may be disposed on the first surface 480A and/or the second surface 480B of the first printed circuit board 480. For example, the protection member may be formed of an insulating member (e.g., resin) covering the electronic components to protect the electronic components from external moisture or the like and a conductive layer (e.g., conformal shielding) formed on a surface of the insulating member to shield electromagnetic interference (EMI), and/or formed of a shield can for covering electronic components. However, the protection member is not limited thereto.

The first printed circuit board 480 may be disposed on the bracket 460. For example, the first printed circuit board 480 may be disposed on the bracket 460 in the first direction D1. In one embodiment, the second surface 480B of the first printed circuit board 480 may face the bracket 460.

The frame 410 (e.g., the frame 310 in FIG. 3) may include a side wall 415 forming at least a portion of a side surface (e.g., the side surface 110C in FIG. 2) of the electronic device 400. The side wall 415 of the frame 410 may extend in a height direction (e.g., the first direction D1) of the electronic device 400. The side wall 415 may surround the bracket 460. When the frame 410 is viewed from above (e.g., when viewed in the first direction D1 or the second direction D2), the shape of the side wall 415 may be substantially circular. However, the shape is limited thereto, and the side wall 415 may have various shapes such as a quadrangle, a quadrangle with rounded corners, a polygon, or the like.

The frame 410 may include a first point 411 and a second point 412. The first point 411 and/or the second point 412 may be formed directly on the side wall 415 and/or may be formed to protrude inwardly from the side wall 415.

The side wall 415 of the frame 410 may include a first portion 413 and a second portion 414. The first portion 413 may extend from the first point 411 to the second point 412 in one direction (e.g., counterclockwise). The first portion 413 may have a first length. The second portion 414 may extend from the first point 411 to the second point 412 in a direction other than the one direction (e.g., clockwise). The second portion 414 may have a second length shorter than the first length.

The electronic device 400 may include at least one antenna formed from at least a portion of the frame 410. For example, the electronic device 400 may include at least one antenna powered at the first point 411 of the frame 410 and grounded at the second point 412 and configured to transmit and receive wireless signals.

The first point 411 of the frame 410 may be in contact with a first connector 481 disposed on the second surface 480B of the first printed circuit board 480. The first connector 481 may include, for example, a c-clip connector, but is not limited thereto. In one embodiment, a wireless communication circuit (e.g., a wireless communication circuit 1092 in FIG. 10) disposed on the first printed circuit board 480 may be electrically connected to the first point 411 of the frame 410 through a transmission line formed on the first printed circuit board 480 and the first connector 481 electrically connected to the transmission line. The transmission line may include a conductive trace provided by the first printed circuit board 480. The conductive trace may include, for example, a copper foil, but is not limited thereto.

The second point 412 of the frame 410 may be in contact with a second connector 482 disposed on the second surface 480B of the first printed circuit board 480. The second connector 482 may include, for example, a c-clip connector, but is not limited thereto. The second point 412 of the frame 410 may be electrically connected to a ground plane of the first printed circuit board 480 via the second connector 482. The ground plane may include a conductive layer positioned on at least one layer of the first printed circuit board 480. The conductive layer may include, for example, a copper layer. The ground plane may be formed as one or a plurality of regions on one or a plurality of layers of the printed circuit board. The ground plane may be referred as at least one grounding portion.

An antenna formed from at least a portion of the frame 410 may form a first resonant frequency corresponding to a first designated band (e.g., a low-band (LB) below 1 GHz, but not limited thereto) and a second resonant frequency corresponding to a second designated band (e.g., a mid-band (MB) from 1 GHz to 2.3 GHZ, but not limited thereto). For example, the frame 410 may be powered at the first point 411 and short-circuited to the ground plane at the second point 412 to form the first resonant frequency band and/or the second resonant frequency band. The first resonant frequency and the second resonant frequency may vary depending on a circumferential length (e.g., the first length and the second length) of each of the first portion 413 and the second portion 414 of the frame 410 divided into the first point 411 and the second point 412. The first resonant frequency and the second resonant frequency may vary depending on a current path including the first portion 413 of the frame 410 and a current path including the second portion 414 thereof.

The wireless communication circuit may transmit and receive wireless signals of the first designated band and the second designated band by supplying power to the first point 411 of the frame 410.

The bracket 460 (e.g., the bracket 360 in FIG. 3) may be at least partially accommodated within the space formed by the frame 410. For example, the bracket 460 may be disposed inside the side wall 415 of the frame 410. In one embodiment, the bracket 460 may be at least partially spaced apart from the side wall 415 of the frame 410. For example, the bracket 460 may include a side surface 460C facing the side wall 415, and the side surface 460C may be at least partially spaced apart from the side wall 415.

The second printed circuit board 50 may include a flexible printed circuit board or a rigid-flexible printed circuit board, at least a portion of which may be bent.

The second printed circuit board 50 may be at least partially disposed between the bracket 460 and the side wall 415. For example, the second printed circuit board 50 may be partially seated in an accommodating groove 462 formed in the side surface 460C of the bracket 460 and positioned between the bracket 460 and the side wall 415.

The second printed circuit board 50 may be coupled to the bracket 460. The second printed circuit board 50 may be fixedly disposed on the side surface 460C of the bracket 460. For example, the second printed circuit board 50 may be coupled to the bracket 460 in such a way that a protrusion 464 formed in the accommodating groove 462 and a hole 537 formed in the second printed circuit board 50 are insertion-coupled together. Additionally or alternatively, the second printed circuit board 50 may be attached to the side surface 460C of the bracket 460 via an adhesive member (e.g., adhesive members 71, 72, and 73 in FIG. 9b).

The second printed circuit board 50 may at least partially overlap the side wall 415 of the frame 410 and/or the bracket 460 when the side surface of the electronic device 400 is viewed (e.g., when viewed in a direction perpendicular to the first direction D1).

The second printed circuit board 50 may be disposed between the bracket 460 and the first portion 413 of the frame 410. For example, the second printed circuit board 50 may be closer to the first portion 413 than to the second portion 414 of the frame 410. However, the second printed circuit board 50 is not limited thereto. For example, the second printed circuit board 50 may be disposed between the second portion 414 of the frame 410 and the bracket 460.

The second printed circuit board 50 may include a first portion 51, a second portion 52, and an extension portion 53. The extension portion 53 may be positioned between the bracket 460 and the side wall 415. The extension portion 53 may extend along the side wall 415 of the frame 410 (or the side surface 460C of the bracket 460. The extension portion 53 may be at least partially accommodated in the accommodating groove 462 of the bracket 460.

The extension portion 53 may include a first end 53A and a second end 53B. The extension portion 53 may include a portion 53C between the first end 53A and the second end 53B. When the electronic device 400 is viewed from above (e.g., when viewed in the second direction D2), the first end 53A of the extension portion 53 may be positioned between the first button 416 and the bracket 460. When the electronic device 400 is viewed from above (e.g., when viewed in the second direction D2), the second end 53B may be positioned between the second button 417 and the bracket 460.

Various components of the electronic device 400 may be disposed on the extension portion 53. For example, a first component 531, a second component 532, and a third component 533 may be disposed on the extension portion 53. For example, the first component 531 may be disposed at the first end 53A of the extension portion 53. For example, the second component 532 may be disposed at the second end 53B of the extension portion 53. For example, the third component 533 may be disposed on the portion 53C between the first end 53A and the second end 53B of the extension portion 53. The third component 533 may be positioned between the bracket 460 and the portion 53C of the extension portion 53, but is not limited thereto.

The first component 531 may be operatively connected to the first button 416. The first component 531 may include a first dome switch and/or a first biometric sensor. The first dome switch may generate an electrical signal by being pressed by the first button 416 (e.g., the key input device 104 in FIG. 1) according to the user's operation. The first biometric sensor may include a first biometric sensor structure for detecting first biometric information. The first biometric sensor structure may include a conductive structure, and the conductive structure may be electrically connected to the first button 416 formed at least partially of a conductive material. The first biometric sensor and the first button 416 may operate as electrodes for detecting the user's biometric information when the user's body comes into contact with the first button 416. The signal detected through the first biometric sensor and the first button 416 may be transmitted to the processor (e.g., the processor 1020 in FIG. 10) of the electronic device 400 through the second printed circuit board 50. The processor may acquire the user's first biometric information based on the detected signal.

The first biometric sensor may include, for example, a bioelectrical impedance analysis sensor (BIA sensor). In this case, the first biometric information may include information about the components of the user's body. However, the first biometric information is not limited to the example described above.

The second component 532 may be operatively connected to the second button 417. The second component 532 may include a second dome switch and/or a second biometric sensor different from the first biometric sensor. The second dome switch may generate an electrical signal by being pressed by the second button 417 according to the user's operation. The second biometric sensor may include a second biometric sensor structure for detecting second biometric information. The second biometric sensor structure may include a second conductive structure. The second conductive structure may be electrically connected to the second button 417 formed at least partially of a conductive material. The second biometric sensor and the second button 417 may operate as electrodes for detecting the user's biometric information when the user's body comes into contact with the second button 417. The signal detected by the second biometric sensor and the second button 417 may be transmitted to the processor through the second printed circuit board 50. The processor may acquire the user's second biometric information based on the detected signal.

The second biometric sensor may include, for example, an electrocardiogram sensor (ECG sensor). In this case, the second biometric information may include the user's electrocardiogram information. However, the second biometric information is not limited to the example described above.

The electronic device 400 may include an analog-to-digital converter that processes analog signals detected from the first biometric sensor and the second biometric sensor into digital signals and transmits the digital signals to the processor. The analog-to-digital converter may be disposed on, for example, the first printed circuit board 480, but is not limited thereto.

The third component 533 may include, for example, an acoustic sensor. The third component 533 may be positioned between the extension portion 53 and the bracket 460. In one embodiment, a microphone hole 535 through which sound is introduced may be formed in the third component 533. The microphone hole 535 may be aligned with an opening 536 formed in the portion 53C of the extension portion 53. The microphone hole 535 may communicate with the opening 536 formed in the portion 53C of the extension portion 53.

The first portion 51 of the second printed circuit board 50 may extend from the first end 53A of the extension portion 53. The first portion 51 of the second printed circuit board 50 may extend from the first end 53A of the extension portion 53 to face the first surface 480A of the first printed circuit board 480. The first portion 51 may be disposed on the first surface 480A of the first printed circuit board 480. For example, the first portion 51 may include a plug 511 of the connector. A receptacle 487 of the connector may be disposed on the first surface 480A of the first printed circuit board 480. By coupling the plug 511 and the receptacle 487 to each other, the first portion 51 may be connected to the first surface 480A of the first printed circuit board 480. However, the structure for connecting the second printed circuit board 50 to the first printed circuit board 480 is not limited to the connector structure formed by the above-described receptacle and plug. In another embodiment, the first portion 51 may be disposed on the second surface 480B of the first printed circuit board 480.

At least one processor (e.g., the processor 1020 in FIG. 10) disposed on the first printed circuit board 480 may be operatively connected to the first component 531, the second component 532, and the third component 533 through the second printed circuit board 50. For example, the at least one processor may be electrically connected to the first component 531, the second component 532, and the third component 533 through conductive traces (or conductive patterns) provided by the first printed circuit board 480 and the second printed circuit board 50. The at least one processor may transmit electrical signals to the first component 531, the second component 532, and the third component 533 through the first portion 51 of the second printed circuit board 50. The at least one processor may receive electrical signals from the first component 531, the second component 532, and the third component 533 through the first portion 51 of the second printed circuit board 50.

The second portion 52 of the second printed circuit board 50 may extend from the extension portion 53. For example, the second portion 52 may extend from the portion 53C of the extension portion 53. The second portion 52 may extend between the first printed circuit board 480 and the bracket 460. The second portion 52 may face the second surface 480B of the first printed circuit board 480. The second portion 52 may be positioned on the second surface 480B of the first printed circuit board 480.

The first button 416 and the second button 417 may be at least partially exposed through the frame 410. The first button 416 and the second button 417 may at least partially overlap the second printed circuit board 50 when viewed toward a side surface (e.g., the side surface 110C in FIG. 2) of the frame 410 (e.g., when viewed in a direction perpendicular to the first direction D1). The first button 416 and the second button 417 may at least partially overlap the extension portion 53 of the second printed circuit board 50 when the side wall 415 of the frame 410 is viewed directly from the front (e.g., when viewed in the direction perpendicular to the first direction D1). For example, the first button 416 may at least partially overlap the first end 53A of the extension portion 53. For example, the second button 417 may at least partially overlap the second end 53B of the extension portion 53.

The display 420 (e.g., the display 120 in FIG. 3) may be at least partially disposed within the frame 410. The bracket 460 may be disposed between the display 420 and the first printed circuit board 480. The first printed circuit board 480 may be disposed in one direction (e.g., the first direction D1) of the bracket 460. The display 420 may be disposed in the other direction (e.g., the second direction D2) of the bracket 460. The bracket 460 may support the display 420 and the first printed circuit board 480.

The first printed circuit board 480 may be coupled to the bracket 460 through the screw 60. For example, referring to FIGS. 4a, 4b, 4c, and 5, the screw 60 may pass through the washer 62, the first printed circuit board 480, and the second portion 52 of the second printed circuit board 50 in this order in the second direction D2. The screw 60 may pass through a hole 83 formed in the first printed circuit board 480 and a hole 523 formed in the second portion 52 of the second printed circuit board 50 to be fastened to a fastening groove 463 formed in the bracket 460. The fastening groove 463 may be formed on a first surface 460A of the bracket 460. The first surface 460A may extend from the side surface 460C of the bracket 460 and face the first printed circuit board 480.

Figure 6A:
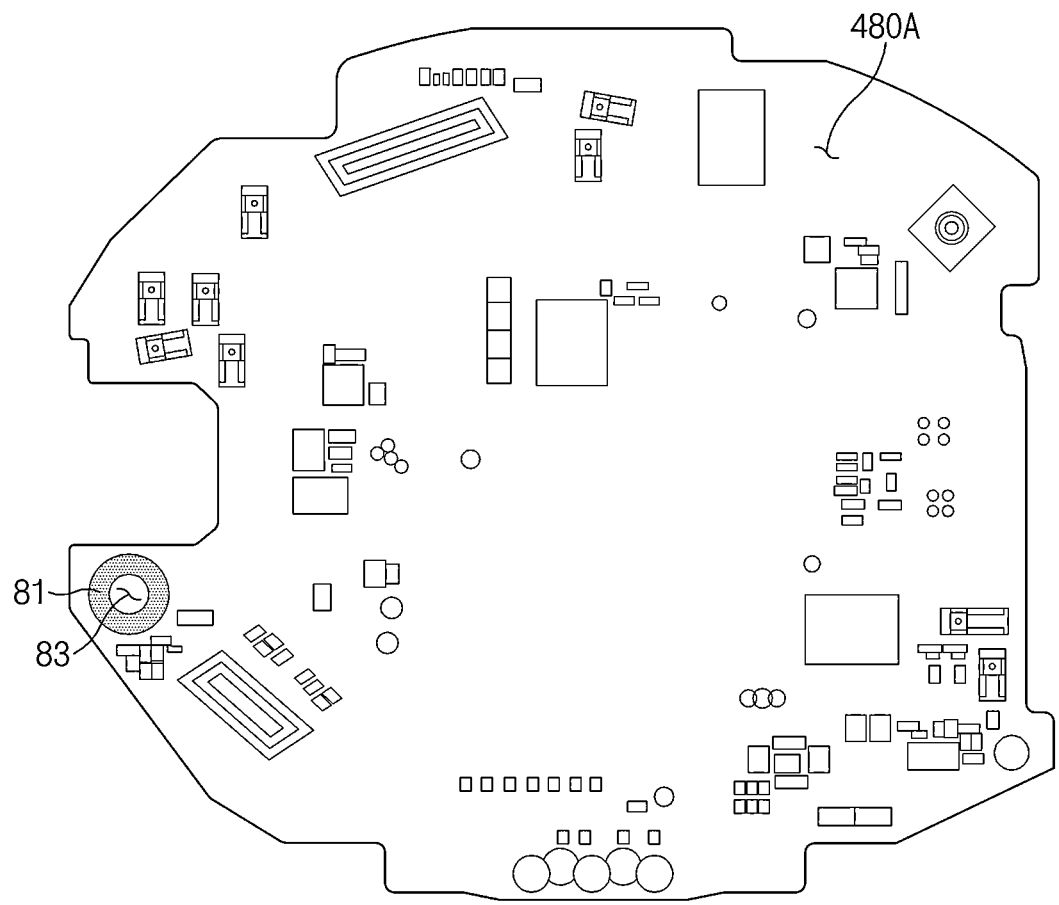
FIG. 6A shows a first surface of a first printed circuit board according to an embodiment.
Figure 6B:
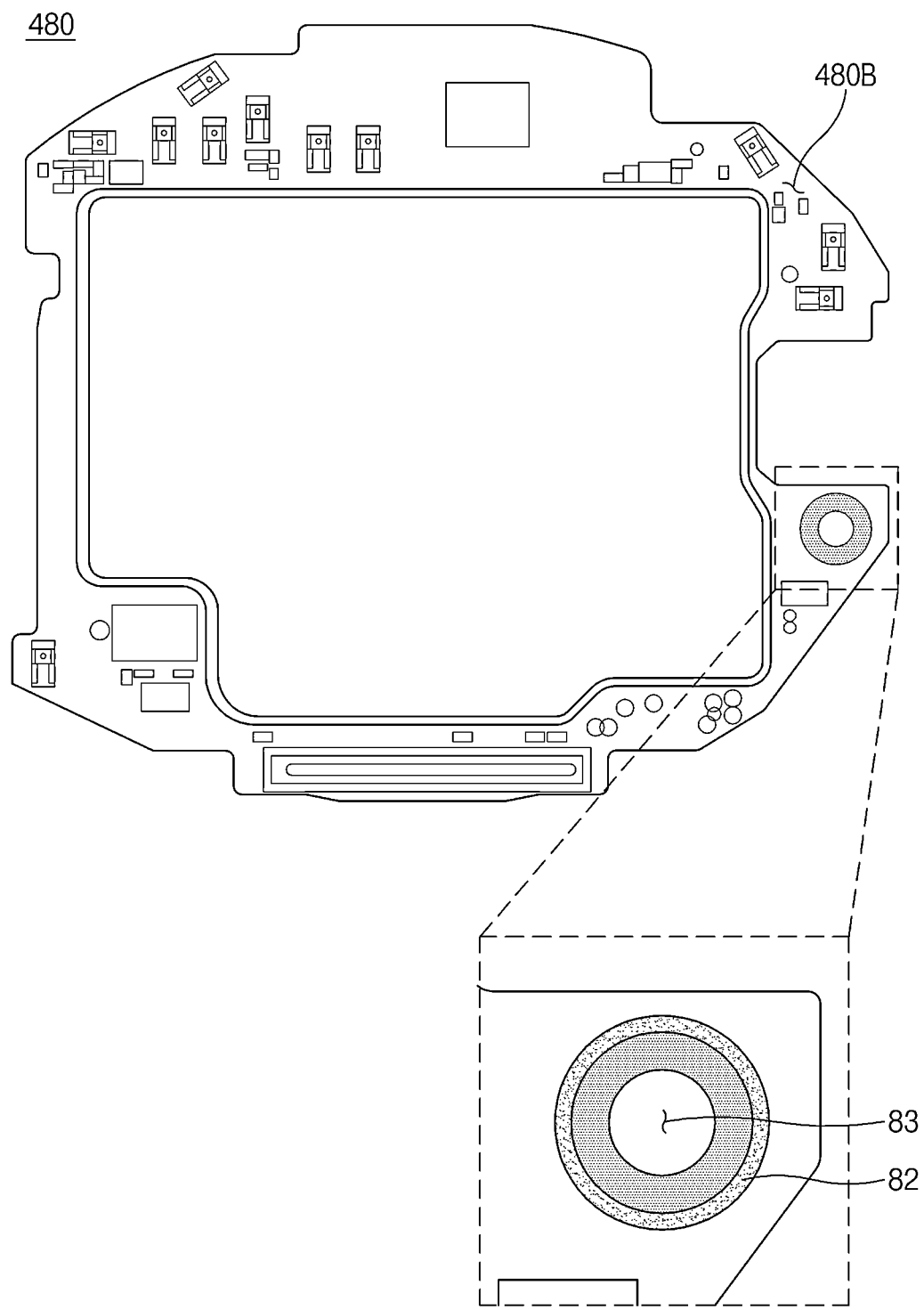
FIG. 6B shows a second surface of the first printed circuit board according to an embodiment.

FIG. 6a shows the first surface of the first printed circuit board according to one embodiment. FIG. 6b shows the second surface of the first printed circuit board according to one embodiment. Referring to FIGS. 6a and 6b, the first printed circuit board 480 may include the hole 83. The hole 83 may pass through the first printed circuit board 480. The first printed circuit board 480 may include a first conductive region 81 formed on the first surface 480A and a second conductive region 82 formed on the second surface 480B. The first conductive region 81 may include a region where a conductive pattern of the first printed circuit board 480 is partially exposed through the first surface 480A. The second conductive region 82 may include a region where a conductive pattern of the first printed circuit board 480 is partially exposed through the second surface 480B.

The first conductive region 81 may surround the hole 83. When the first surface 480A is viewed, the first conductive region 81 may be formed around the hole 83. The second conductive region 82 may be formed to surround the hole 83. When the second surface 480B is viewed, the second conductive region 82 may be formed around the hole 83. The second conductive region 82 may be spaced apart from the hole 83. For example, when the second surface 480B is viewed, the second conductive region 82 may be completely spaced apart from the perimeter of the hole 83.

The first printed circuit board 480 may include at least one grounding portion (or ground plane). The first conductive region 81 and the second conductive region 82 of the first printed circuit board 480 may be electrically connected to at least one grounding portion.

Figure 6C:
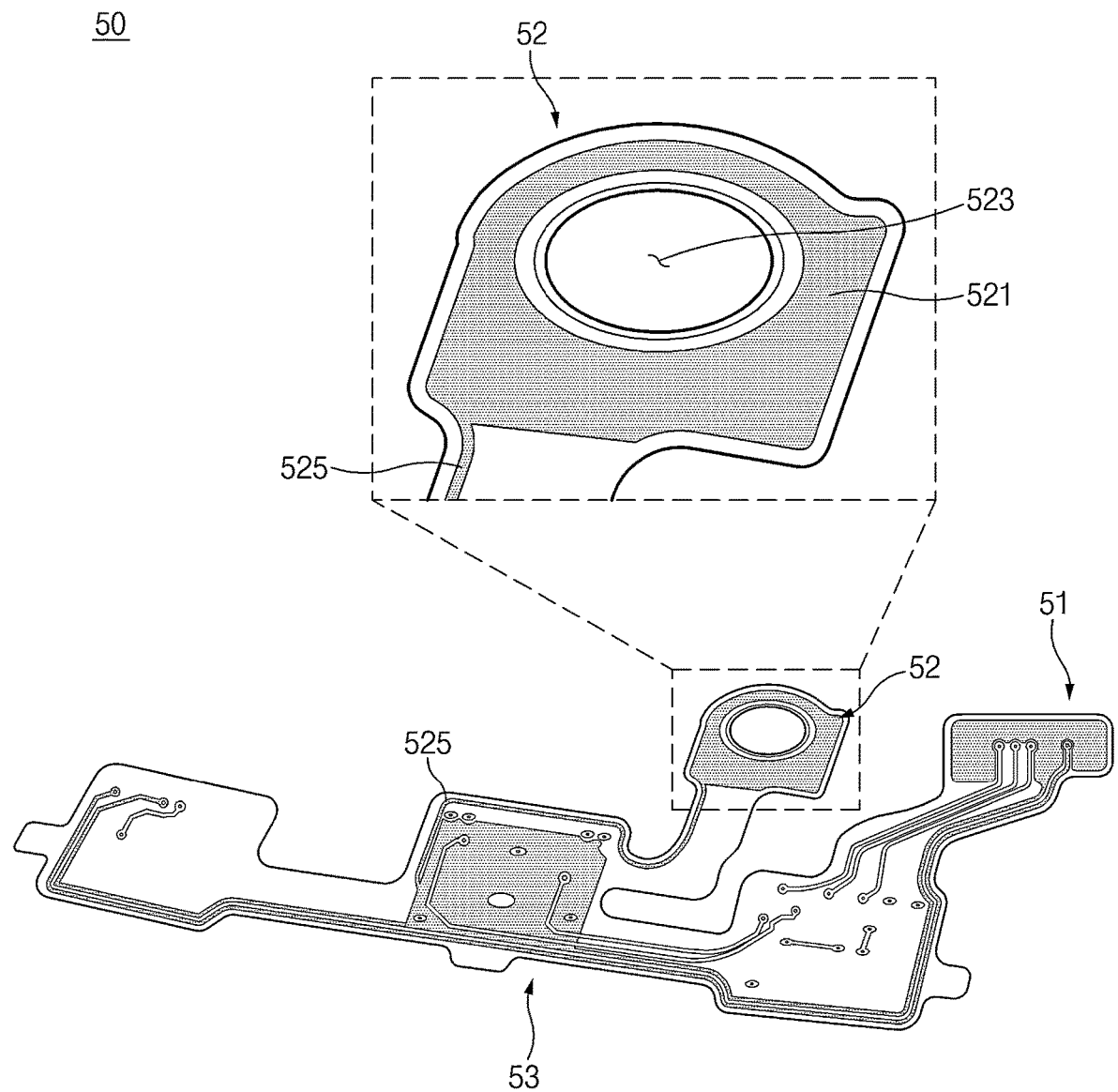
FIG. 6C is a view showing a second printed circuit board according to an embodiment.

FIG. 6c is a view showing the second printed circuit board according to one embodiment. FIG. 6c may be a view showing one layer of the second printed circuit board having a structure in which a plurality of layers are stacked. Referring to FIG. 6c, a conductive region 521 (or conductive pad) in which a conductive pattern of the second printed circuit board 50 is partially exposed may be formed on the second portion 52 of the second printed circuit board 50. The conductive region 521 may surround the hole 523. The conductive region 521 may be formed to surround the hole 523. The conductive region 521 may be spaced apart from the hole 523. For example, the conductive region 521 may be completely spaced from the perimeter of the hole 523.

The second printed circuit board 50 may include a plurality of conductive traces (or patterns). The plurality of conductive traces may include signal lines and power lines for the operation of the first component 531, the second component 532, and the third component 533, and a plurality of ground lines. At least some of the plurality of ground lines may be electrically connected, directly or indirectly (e.g., via another ground line), to the conductive region 521 of the second portion 52. The plurality of ground lines may be electrically connected to the ground plane of the first printed circuit board 480 through the conductive region 521 of the second portion 52. For example, the second printed circuit board 50 may include a conductive trace 525. The conductive trace 525 may extend from the conductive region 521. The conductive trace 525 may form an electrical path extending from the first portion 51 of the second printed circuit board 50 to the second portion 52 through the extension portion 53. The conductive trace 525 may be electrically connected to the ground plane of the first printed circuit board 480 through the conductive region 521 of the second portion 52. The conductive trace 525 may also be referred to as a "ground trace."

Figure 6D:
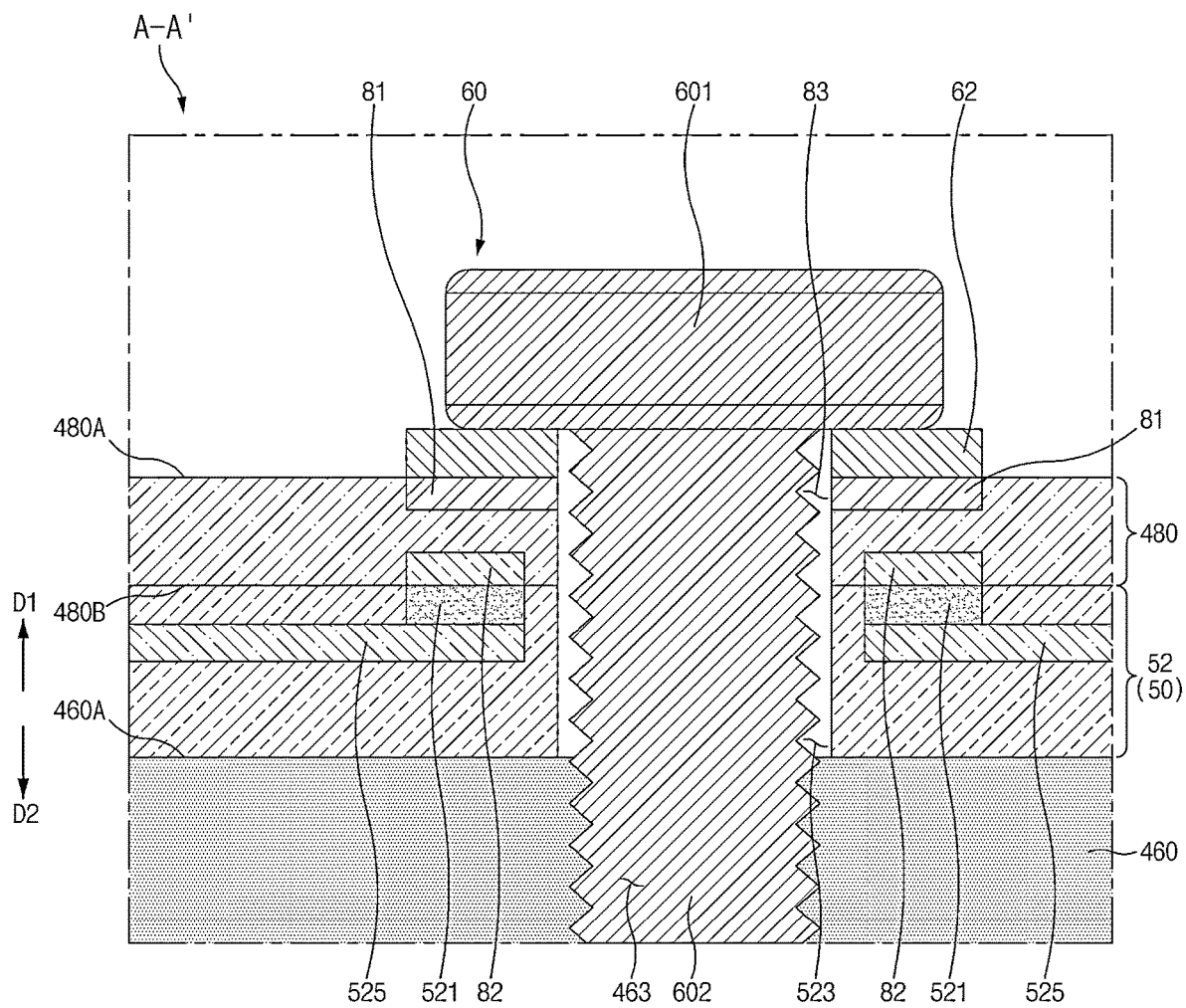
FIG. 6D is a cross-sectional view taken along line A-A' of FIG. 4C.

FIG. 6d is a cross-sectional view taken along line A-A' of FIG. 4c. Referring to FIG. 6d, the screw 60 may include a head 601 and a shank 602 extending from the head 601. The shank 602 may include a thread and a groove that at least partially form the screw so as to be capable of being fastened to the fastening groove 463. The screw 60 may include a conductive material (e.g., a conductive metal). The screw 60 may be fastened to the fastening groove 463 of the bracket 460 by passing through the hole 83 of the first printed circuit board 480 and the hole 523 of the second printed circuit board 50. The hole 83 of the first printed circuit board 480, the hole 523 of the second printed circuit board 50, and the fastening groove 463 of the bracket 460 may be at least partially aligned along a direction in which the screw 60 passes through. As the screw 60 is fastened, the first printed circuit board 480 and the second printed circuit board 50 may be pressed in a fastening direction of the screw 60 (e.g., the second direction D2).

The washer 62 may be disposed between the head 601 of the screw 60 and the first surface 480A of the first printed circuit board 480. The washer 62 may come into contact with the first conductive region 81. The first conductive region 81 may be electrically connected to the screw 60 through the washer 62.

The second conductive region 82 of the first printed circuit board 480 and the conductive region 521 of the second printed circuit board 50 may face each other. The second conductive region 82 of the first printed circuit board 480 may face the second portion 52 of the second printed circuit board 50, and the conductive region 521 of the second printed circuit board 50 may face the second surface 480B of the first printed circuit board 480.

The second conductive region 82 of the first printed circuit board 480 may be in contact with the conductive region 521 of the second printed circuit board 50. The second conductive region 82 and the conductive region 521 may be electrically connected. The second conductive region 82 of the first printed circuit board 480 may be electrically connected to the conductive region 521 of the second printed circuit board 50 by being in surface-to-surface contact with each other. The conductive trace 525 of the second printed circuit board 50 extending to the conductive region 521 may be electrically connected to at least one grounding portion of the first printed circuit board 480 through the second conductive region 82. A structure in which the second conductive region 82 of the first printed circuit board 480 and the conductive region 521 of the second printed circuit board 50 are in surface-to-surface contact may improve the electrical connectivity of an electrical loop structure (e.g., an electrical loop structure L in FIG. 7) provided by the second printed circuit board 50. The conductive region 521 of the second printed circuit board 50 may be electrically connected to the grounding portion of the first printed circuit board 480 without a separate connector (e.g., C-Clip). Accordingly, the electronic device may be miniaturized and manufacturing costs may be reduced.

The second conductive region 82 of the first printed circuit board 480 may not come into contact with the screw 60. The second conductive region 82 of the first printed circuit board 480 may be electrically opened to the screw 60. The conductive region 521 of the second printed circuit board 50 may not come into contact with the screw 60. The conductive region 521 of the second printed circuit board 50 may be electrically opened to the screw 60.

Figure 7:
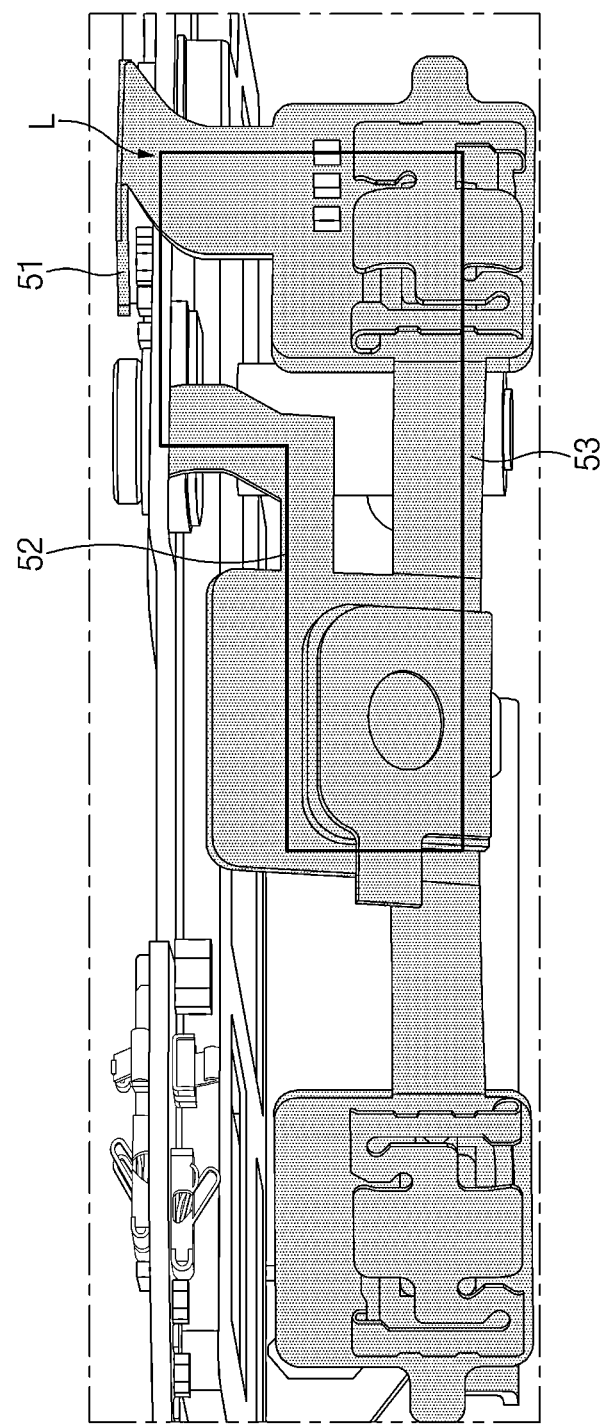
FIG. 7 is a view showing an electrical loop of the electronic device according to an embodiment.
Figure 8:
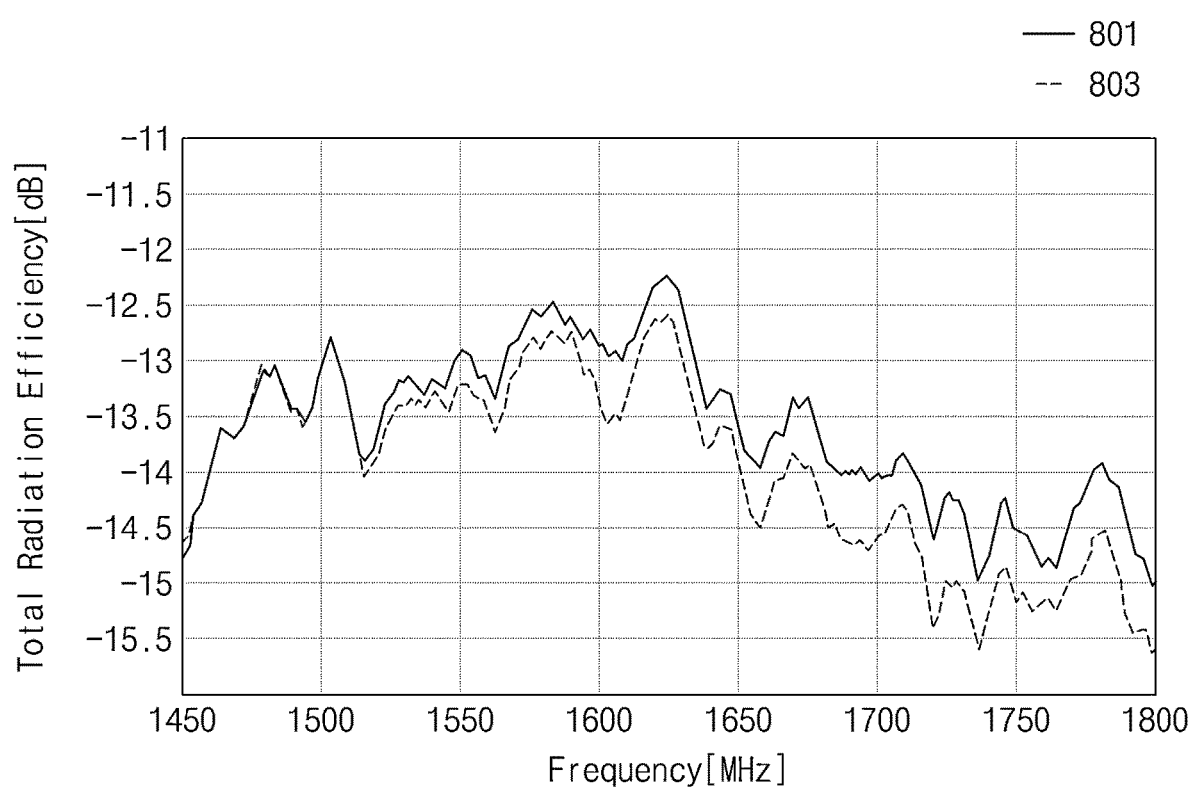
FIG. 8 is a graph showing radiation efficiency of an electronic device according to an embodiment and an electronic device according to a comparative embodiment.

FIG. 7 is a view showing an electrical loop of the electronic device according to one embodiment. FIG. 8 is a graph showing radiation efficiency of an electronic device according to one embodiment and an electronic device according to a comparative embodiment.

Referring to FIG. 7 together with FIG. 6d, the electronic device according to one embodiment may include an electrical loop structure L. The electrical loop structure L may include the conductive trace 525 extending from the first portion 51 of the second printed circuit board 50 to a second portion 52 through the extension portion 53, the conductive region 521 electrically connected to the conductive trace 525 and formed in the second portion 52, the second conductive region 82 of the first printed circuit board 480 electrically connected to the conductive region 521, and at least one grounding portion of the first printed circuit board 480 electrically connected to the second conductive region 82.

Through the electrical loop structure, noise and/or parasitic components of the antenna may be reduced, and performance degradation of the antenna may be reduced and/or prevented. For example, referring to FIG. 8, an electronic device 801 according to one embodiment may have higher radiation efficiency than an electronic device 803 according to a comparative embodiment. The electronic device 803 according to the comparative embodiment may not include the electrical loop structure described above.

The first conductive region 81 may be electrically connected to the screw 60, and the second conductive region 82 may not be electrically connected to the screw 60. The second conductive region 82 may electrically connect the conductive region 521 to the grounding portion of the first printed circuit board 480 to provide the electrical loop structure L, and the first conductive region 81 may provide a different electrical path distinct from the electrical loop structure L. The first conductive region 81 may be electrically connected to the grounding portion of the first printed circuit board 480 and the screw 60, and the screw 60 may be electrically connected to another component. The other component may include a conductive plate for providing electromagnetic shielding to a battery (e.g., the battery 370 in FIG. 3) of the electronic device, for example, but is not limited thereto.

Based on FIG. 7, the electric loop structure L is illustrated as extending to the second portion 52 through the central portion (e.g., the portion 53C in FIG. 4a) of the extension portion 53, but is not limited thereto. For example, the electrical loop structure L may extend to the second portion 52 through the second end (e.g., the second end 53B in FIG. 4a) of the extension portion 53.

Figure 9A:
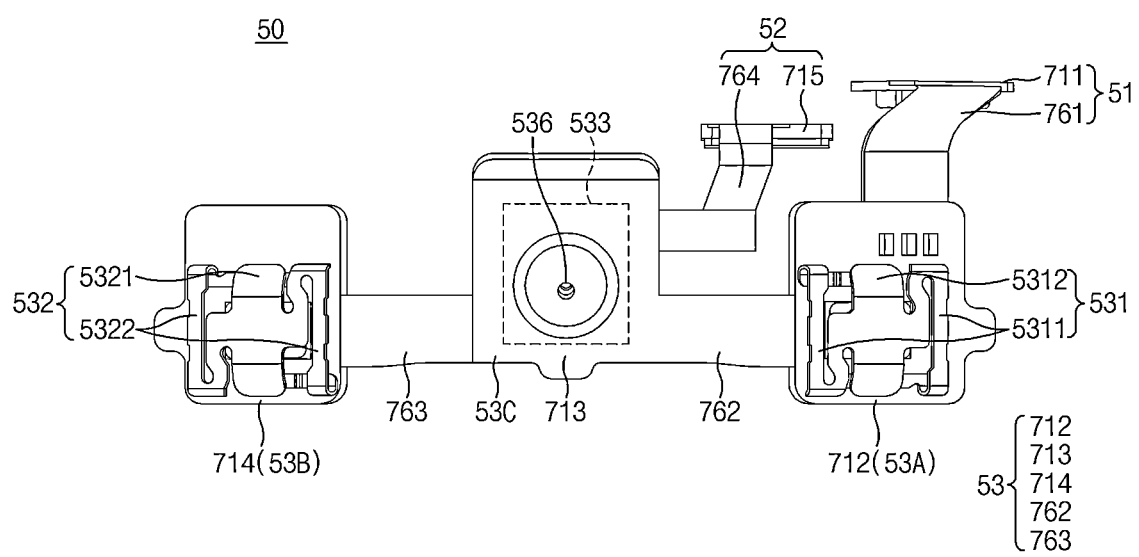
FIG. 9A is a view showing the second printed circuit board according to an embodiment.
Figure 9B:
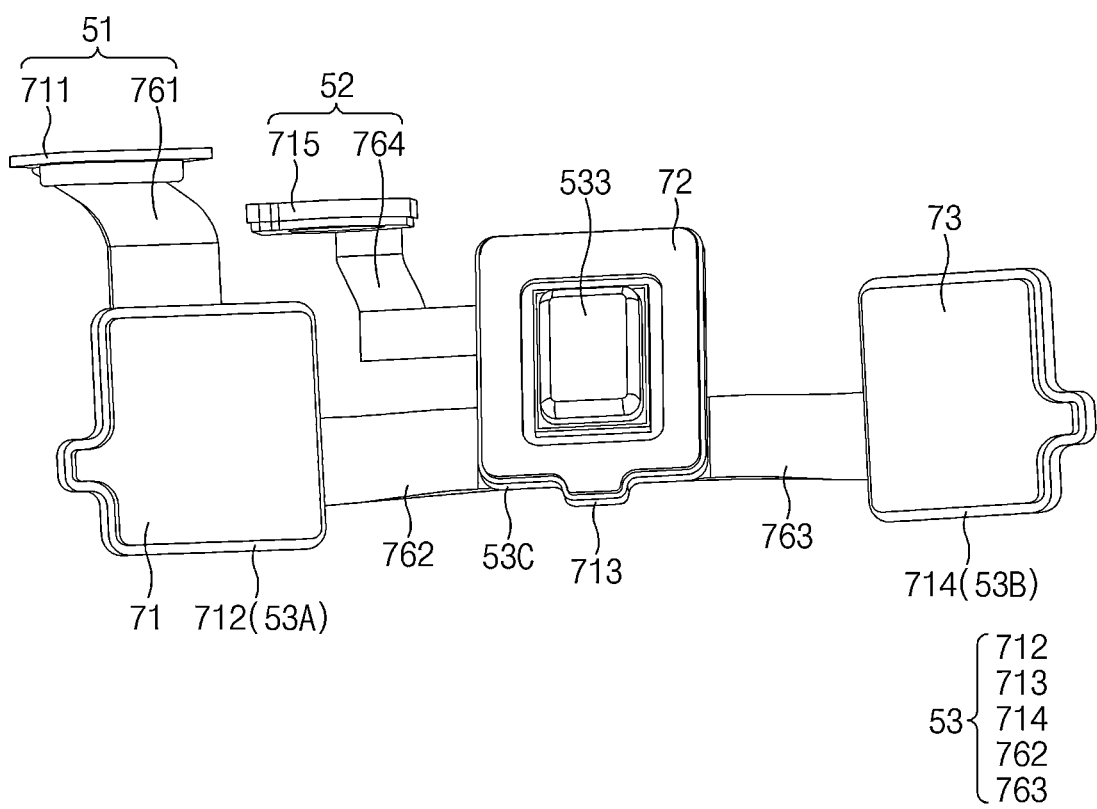
FIG. 9B is a view showing the second printed circuit board according to an embodiment.

FIG. 9a is a view showing the second printed circuit board according to one embodiment. FIG. 9b is a view showing the second printed circuit board according to one embodiment. Referring to FIGS. 9a and 9b together with FIG. 4a, the second printed circuit board 50 according to one embodiment may be at least partially bent. In one embodiment, the second printed circuit board 50 may include a flexible portion (flexible portions) and a rigid portion (rigid portions). For example, the second printed circuit board 50 may include a first rigid portion 711, a second rigid portion 712, a third rigid portion 713, a fourth rigid portion 714, a fifth rigid portion 715, a first flexible portion 761, a second flexible portion 762, a third flexible portion 763, and a fourth flexible portion 764.

The plug 511 may be disposed in the first rigid portion 711. The first flexible portion 761 may connect the first rigid portion 711 and the second rigid portion 712. For example, the first flexible portion 761 may extend from the first rigid portion 711 to the second rigid portion 712. The first rigid portion 711 and the first flexible portion 761 may be referred to as the first portion 51 of the second printed circuit board 50 in that they extend from the first end 53A of the extension portion 53.

The first component 531 may be disposed on the second rigid portion 712. The second flexible portion 762 may connect the second rigid portion 712 and the third rigid portion 713. For example, the second flexible portion 762 may extend from the second rigid portion 712 to the third rigid portion 713. The third component 533 may be disposed on the third rigid portion 713, and an opening 536 communicating with the microphone hole 535 of the third component 533 may be formed.

The third flexible portion 763 may connect the third rigid portion 713 and the fourth rigid portion 714. For example, the third flexible portion 763 may extend from the third rigid portion 713 to the fourth rigid portion 714 in a direction away from the second flexible portion 762. The second component 532 may be disposed on the fourth rigid portion 714.

The second rigid portion 712, the second flexible portion 762, the third rigid portion 713, the third flexible portion 763, and the fourth rigid portion 714 may extend along the side wall 415 of the frame 410 or the side surface 460C of the bracket 460. In this respect, the second rigid portion 712, the second flexible portion 762, the third rigid portion 713, the third flexible portion 763, and the fourth rigid portion 714 may be referred to as the extension portion 53 of the second printed circuit board 50. The first end 53A of the second printed circuit board 50 may be referred to as including at least a portion of the second rigid portion 712. The second end 53B of the second printed circuit board 50 may be referred to as including at least a portion of the fourth rigid portion 714. The portion 53C of the second printed circuit board 50 may be referred to as including at least a portion of the third rigid portion 713.

The fourth flexible portion 764 may connect the third rigid portion 713 and the fifth rigid portion 715. The fourth flexible portion 764 may extend from the third rigid portion 713 to the fifth rigid portion 715. The fourth flexible portion 764 and the fifth rigid portion 715 may be referred to as the second portion 52 of the second printed circuit board 50 in that they extend from the portion 53C of the extension portion 53. Based on FIG. 9a, the second portion 52 is illustrated as extending from the right side of the third rigid portion 713, but is not limited thereto. For example, the second portion 52 may extend from the left side of the third rigid portion 713.

However, the distinction between the above-described rigid portion and the flexible portion is exemplary, and various design changes may be possible. For example, when the third component 533 is omitted, the third rigid portion 713 may be replaced with the flexible portion. For another example, the first end 53A (or the second end 53B) of the extension portion 53 has been described as including at least a portion of the second rigid portion 712 (or the fourth rigid portion 714), but in other embodiments, the first end 53A and/or the second end 53B of the extension portion 53 may be formed at least partially as the flexible portion.

The first component 531 and/or the second component 532 may include a biometric sensor. The biometric sensor may include a conductive structure (e.g., a conductive plate) for electrically connecting (or for conductive connection) to the buttons 416 and 417 so that the electronic device 400 may acquire the user's biometric information. The conductive structure may include contact portions 5311 and 5321 that at least partially contact the buttons 416 and 417. The conductive structure may include fixing portions 5312 and 5322 extending from the contact portions 5311 and 5321 and electrically connected to the ends 53A and 53B of the second printed circuit board 50. The dome switch may be disposed between the conductive structure and one surface of the second printed circuit board 50.

Optionally, a first adhesive member 71, a second adhesive member 72, and a third adhesive member 73 for attaching the second printed circuit board 50 to the bracket 460 may be disposed on the second rigid portion 712, the third rigid portion 713, and the fourth rigid portion 714. The first adhesive member 71, the second adhesive member 72, and the third adhesive member 73 may include, for example, a double-sided tape.

According to one embodiment of the present disclosure, an electronic device (e.g., the electronic device 100 in FIG. 1) may include a frame (e.g., the frame 410 in FIG. 4a) including a side wall (e.g., the side wall 415 in FIG. 4a) and at least partially forming an antenna, a bracket (e.g., the bracket 460 in FIG. 4a) disposed within the frame, a first printed circuit board (e.g., the first printed circuit board 480 in FIG. 4a) disposed on the bracket and including at least one grounding portion, a second printed circuit board (e.g., the second printed circuit board 53 in FIG. 4a) disposed within the frame, and a screw (e.g., the screw 60 in FIG. 4a) assembled with the first printed circuit board, the second printed circuit board, and the bracket. In one embodiment, the second printed circuit board may include a first portion (the first portion 51 in FIG. 4a) coupled to the first printed circuit board, an extension portion (the extension portion 53 in FIG. 4a) extending from the first portion between the side wall of the frame and the bracket, and a second portion (the second portion 50 in FIG. 4a) extending from the extension portion between the first printed circuit board and the bracket. In one embodiment, the screw may be fastened to the bracket by passing through the first printed circuit board and the second portion of the second printed circuit board. In one embodiment, the second printed circuit board may include a conductive trace (e.g., the conductive trace 525 in FIG. 6c) extending from the first portion to the second portion through the extension portion. In one embodiment, the conductive trace may be electrically connected to the at least one grounding portion of the first printed circuit board in the second portion.

In one embodiment, the first printed circuit board may include a first surface (e.g., the first surface 480A in FIG. 6a) and a second surface (e.g., the second surface 480B in FIG. 6b) opposite to the first surface and facing the bracket. In one embodiment, the first printed circuit board may include a first conductive region (e.g., the second conductive region 82 in FIG. 6b) formed on the second surface. In one embodiment, the second portion of the second printed circuit board may include, a second conductive region (e.g., the conductive region 521 in FIG. 6c) facing the first conductive region. In one embodiment, the conductive trace may be electrically connected to the at least one grounding portion through the first conductive region and the second conductive region in contact with each other.

In one embodiment, the first conductive region may extend from the at least one grounding portion. In one embodiment, the conductive trace may extend from the second conductive region.

In one embodiment, the second portion of the second printed circuit board may include a hole through which the screw passes (e.g., the hole 523 in FIG. 6c). In one embodiment, the second conductive region may surround the hole.

In one embodiment, the second conductive region may be completely spaced apart from the perimeter of the hole.

In one embodiment, the first printed circuit board may include a hole through which the screw passes (e.g., the hole 83 in FIG. 6b). In one embodiment, the first conductive region may surround the hole.

In one embodiment, the first printed circuit board may include a third conductive region (e.g., the first conductive region 81 in FIG. 6a) formed on the first surface and contacting the screw.

In one embodiment, the second conductive region of the second printed circuit board may be electrically opened to the screw.

In one embodiment, the second conductive region of the second printed circuit board may not be in contact with the screw.

In one embodiment, the extension portion may include a first end (e.g., the first end 53A in FIG. 9a), a second end (e.g., the second end 53B in FIG. 9a), and a portion between the first end and the second end (e.g., the portion 53C in FIG. 9a). In one embodiment, the first portion may extend from the first end. In one embodiment, the second portion may extend from the portion between the first end and the second end.

The electronic device according to one embodiment may include a first button (e.g., the first button 416 in FIG. 4a) and a second button (e.g., the second button 417 in FIG. 4a) that are at least partially exposed through the side wall. In one embodiment, when viewed in a direction substantially perpendicular to the side wall, the first button may at least partially overlap the first end of the extension portion. In one embodiment, when viewed in the direction substantially perpendicular to the side wall, the second button may at least partially overlap the second end of the extension portion.

The electronic device according to one embodiment may include a first component (e.g., the first component 531 in FIG. 4a) disposed at the first end of the extension portion and operatively connected to the first button and a second component (e.g., the second component 532 in FIG. 4a) disposed at the second end of the extension portion and operatively connected to the second button.

In one embodiment, the first component may include a dome switch.

In one embodiment, the first component may include the dome switch, and the first button and the first component may be configured to acquire biometric information.

The electronic device according to one embodiment may include an acoustic sensor (e.g., the third component 533 in FIG. 4a) disposed on the portion between the first end and the second end of the extension portion.

The electronic device according to one embodiment may include a display (e.g., the display 420 in FIG. 4a) at least partially accommodated in the frame. In one embodiment, the bracket may be positioned between the display and the first printed circuit board.

In one embodiment, the first printed circuit board may include a receptacle. In one embodiment, the first portion of the second printed circuit board may include a plug that is coupled to the receptacle.

In one embodiment, the first conductive region and the second conductive region may be in surface-to-surface contact.

According to one embodiment of the present disclosure, a wearable electronic device (e.g., the electronic device 400 in FIG. 4) may include a frame (e.g., the frame 410 in FIG. 4a) including a side wall (e.g., the side wall 415 in FIG. 4a) and at least partially forming an antenna, a bracket (e.g., the bracket 460 in FIG. 4a) disposed within the frame, a first printed circuit board (e.g., the first printed circuit board 480 in FIG. 4a) disposed on the bracket, a second printed circuit board (e.g., the second printed circuit board 50 in FIG. 4a) disposed within the frame, and a screw (e.g., the screw 60 in FIG. 4a) fastened to the bracket. In one embodiment, the first printed circuit board may include at least one grounding portion and a first conductive region (e.g., the second conductive region 82 in FIG. 6d) electrically connected to the at least one grounding portion. In one embodiment, the second printed circuit board may include a first portion (e.g., the first portion 51 in FIG. 4a) coupled to the first printed circuit board, an extension portion (e.g., the extension portion 53 in FIG. 4a) extending from the first portion between the side wall of the frame and the bracket, and a second portion (e.g., the second portion 52 in FIG. 4a) extending from the extension portion between the first printed circuit board and the bracket to at least partially overlap the first conductive region. In one embodiment, the screw may be fastened to the bracket by passing through the first printed circuit board and the second portion of the second printed circuit board. In one embodiment, the second printed circuit board may include a conductive trace (e.g., the conductive trace 525 in FIG. 6c) extending from the first portion to the second portion through the extension portion. In one embodiment, the conductive trace may be electrically connected to the at least one grounding portion through the first conductive region of the first printed circuit board in the second portion.

In one embodiment, the second portion of the second printed circuit board may include a second conductive region (e.g., the conductive region 521 in FIG. 6d) that contacts the first conductive region. In one embodiment, the second printed circuit board may include a hole through which the screw passes (e.g., the hole 523 in FIG. 6d). In one embodiment, the second conductive region may surround the hole and be spaced apart from the hole. In one embodiment, the first conductive region and the second conductive region may be in surface-to-surface contact.

FIG. 10 is a block diagram illustrating an electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed herein, it is possible to reduce or prevent antenna performance degradation due to noise and/or parasitic components through an electrical loop structure provided by a printed circuit board.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic device comprising:
a frame comprising a side wall and at least partially forming an antenna;
a bracket provided within the frame;
a first printed circuit board provided on the bracket and comprising at least one grounding portion;
a second printed circuit board provided within the frame; and
a screw,
wherein the second printed circuit board comprises:
a first portion coupled to the first printed circuit board;
an extension portion extending from the first portion between the side wall of the frame and the bracket;
a second portion extending from the extension portion between the first printed circuit board and the bracket; and
a conductive trace extending from the first portion to the second portion through the extension portion,
wherein the conductive trace is electrically connected to the at least one grounding portion of the first printed circuit board in the second portion, and
wherein the screw passes through the first printed circuit board and the second portion of the second printed circuit board, and is fastened to the bracket.

2. The electronic device of claim 1, wherein the first printed circuit board comprises a first surface, and a second surface opposite to the first surface and facing the bracket,
wherein the first printed circuit board comprises a first conductive region provided on the second surface,
wherein the second portion of the second printed circuit board comprises a second conductive region facing the first conductive region, and
wherein the conductive trace is electrically connected to the at least one grounding portion through the first conductive region and the second conductive region that are in contact.

3. The electronic device of claim 2, wherein the first conductive region extends from the at least one grounding portion, and
wherein the conductive trace extends from the second conductive region.

4. The electronic device of claim 2, wherein the second portion of the second printed circuit board comprises a hole through which the screw passes, and
wherein the second conductive region surrounds the hole.

5. The electronic device of claim 2, wherein the first printed circuit board comprises a hole through which the screw passes, and
wherein the first conductive region surrounds the hole.

6. The electronic device of claim 2, wherein the first printed circuit board comprises a third conductive region provided on the first surface and in contact with the screw.

7. The electronic device of claim 6, wherein the second conductive region of the second printed circuit board is electrically isolated from the screw.

8. The electronic device of claim 1, wherein the extension portion comprises a first end, a second end, and a portion between the first end and the second end,
wherein the first portion extends from the first end, and
wherein the second portion extends from the portion between the first end and the second end.

9. The electronic device of claim 8, further comprising a first button, and a second button at least partially exposed through the side wall,
wherein, with respect to a direction perpendicular to the side wall, the first button at least partially overlaps the first end of the extension portion, and the second button at least partially overlaps the second end of the extension portion.

10. The electronic device of claim 9, further comprising:
a first component provided at the first end of the extension portion and operatively connected to the first button; and a second component provided at the second end of the extension portion and operatively connected to the second button.

11. The electronic device of claim 8, further comprising an acoustic sensor provided in the portion between the first end and the second end of the extension portion.

12. The electronic device of claim 1, further comprising a display at least partially accommodated in the frame,
wherein the bracket is between the display and the first printed circuit board.

13. The electronic device of claim 1, wherein the first printed circuit board comprises a receptacle, and
wherein the first portion of the second printed circuit board comprises a plug coupled to the receptacle.

14. The electronic device of claim 2, wherein the first conductive region and the second conductive region are in surface-to-surface contact.

15. A wearable electronic device comprising:
a frame comprising a side wall and at least partially forming an antenna;
a bracket provided within the frame;
a first printed circuit board provided on the bracket;
a second printed circuit board provided within the frame; and
a screw,
wherein the first printed circuit board comprises at least one grounding portion, and a first conductive region electrically connected to the at least one grounding portion,
wherein the second printed circuit board comprises:
a first portion coupled to the first printed circuit board;
an extension portion extending from the first portion between the side wall of the frame and the bracket;
a second portion extending from the extension portion between the first printed circuit board and the bracket to at least partially overlap the first conductive region; and
a conductive trace extending from the first portion to the second portion through the extension portion,
wherein the conductive trace is electrically connected to the at least one grounding portion through the first conductive region of the first printed circuit board in the second portion, and
wherein the screw passes through the first printed circuit board and the second portion of the second printed circuit board, and is fastened to the bracket.

16. The wearable electronic device of claim 15, wherein the second portion of the second printed circuit board includes a second conductive region that contacts the first conductive region.

17. The wearable electronic device of claim 16, wherein the second printed circuit board includes a hole through which the screw passes.

18. The wearable electronic device of claim 16, wherein the second conductive region surrounds the hole and is spaced apart from the hole.

19. The wearable electronic device of claim 18, wherein the first conductive region and the second conductive region are in surface-to-surface contact.

20. The wearable electronic device of claim 15, further comprising a display at least partially accommodated in the frame,
wherein the bracket is between the display and the first printed circuit board.

\* \* \* \* \*